United States Patent
Atsuta et al.

(10) Patent No.: US 7,326,919 B2
(45) Date of Patent: Feb. 5, 2008

(54) OPTICAL ENCODER

(75) Inventors: Akio Atsuta, Kanagawa-ken (JP);
Masahiko Igaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/535,298

(22) Filed: Sep. 26, 2006

(65) Prior Publication Data

US 2007/0018086 A1    Jan. 25, 2007

Related U.S. Application Data

(63) Continuation of application No. 11/075,959, filed on Mar. 9, 2005, now Pat. No. 7,132,647.

(30) Foreign Application Priority Data

Mar. 17, 2004  (JP)  .............................. 2004-075827
Apr. 1, 2004   (JP)  .............................. 2004-108687

(51) Int. Cl.
*G01D 5/34*    (2006.01)
(52) U.S. Cl. .............................. 250/231.16; 250/231.14
(58) Field of Classification Search .......... 250/231.14, 250/231.13, 231.16
See application file for complete search history.

(56) References Cited

U.S. PATENT DOCUMENTS

| | | | |
|---|---|---|---|
| 4,263,506 A | 4/1981 | Eptstein | |
| 5,279,044 A | 1/1994 | Bremer | |
| 5,774,074 A | 6/1998 | Cooper et al. | |
| 6,043,483 A | 3/2000 | Schreiber | |
| 6,198,534 B1 | 3/2001 | Hofer et al. | |
| 6,342,697 B1 | 1/2002 | Nagai et al. | |
| 6,392,224 B1 | 5/2002 | Holzapfel et al. | |
| 6,472,658 B2 | 10/2002 | Mayer et al. | |
| 6,713,756 B2 | 3/2004 | Yamamoto et al. | |

(Continued)

FOREIGN PATENT DOCUMENTS

EP    1 154 242    11/2001

(Continued)

OTHER PUBLICATIONS

European Patent Office Search Report (counterpart EP application 05004593), dated Jul. 15, 2005.

(Continued)

*Primary Examiner*—Georgia Epps
*Assistant Examiner*—Stephen Yam
(74) *Attorney, Agent, or Firm*—Morgan & Finnegan LLP

(57) ABSTRACT

A main scale of an optical displacement measuring apparatus has slits arranged on it at regular intervals, a part of which is a missing slit that does not allow light to pass through used for detecting the original point. An index scale has four sets of windows formed on it. The four windows are arranged with mutual phase differences of ¼ P, where P is the pitch of the arrangement of the slits. When a part of the missing slit overlaps with the index scale, no light reaches to photodiodes from the missing slit and only a partial light flux passes through a window, so that the light quantity decreases. An original point signal associated with the missing slit can be obtained by adding up the outputs of all the photodiodes.

4 Claims, 30 Drawing Sheets

U.S. PATENT DOCUMENTS 6,800,842 B2  10/2004  Ito

FOREIGN PATENT DOCUMENTS

| JP | 6-56304 | 7/1994 |
|----|---------|--------|
| JP | 2002-048602 | 2/2002 |
| JP | 2002-323347 | 11/2002 |
| JP | 2003-161645 | 6/2003 |

OTHER PUBLICATIONS

Office Action issued by Chinese Patent Office on Oct. 27, 2006 for Chinese Patent Application No. 2005100554535 (with Japanese translation, without English translation).

Korean Office Action dated Jan. 25, 2007 for Korean counterpart application No. 10-2005-0022194 (No English translation provided).

OPTICAL ENCODER

This application is a continuation of co-pending application Ser. No. 11/075,959, filed Mar. 9, 2005, now U.S. Pat. No. 7,132,647 the entire disclosure of which is hereby incorporated by reference herein.

BACKGROUND OF THE INVENTION

1. Field of the Invention

The present invention relates to an optical encoder that can realize absolute position detection, used for displacement measurement or angle measurement.

2. Related Background Art

The optical encoders basically composed of a main scale on which a first optical grating is formed, an index scale opposed to the main scale on which a second optical grating is formed, a light source for illuminating the main scale with light, a light receiving element for receiving light that has been transmitted or reflected by the first optical grating on the main scale and then returned from the second optical grating on the index scale.

In connection with this type of optical encoder, a system using a light receiving element array that also functions as an index scale has been already proposed, for example in Japanese Patent Publication No. H06-56304. The inventors of this patent application also disclosed an optical encoder of a similar type in Japanese Patent Application Laid-Open No. 2003-161645.

Such an encoder is called an incremental type encoder, in which when the scale moves, the movement amount can be detected based on increase and decrease of a pulse. The incremental type encoder suffers from the problem that the absolute position cannot be detected and therefore a separate sensor for detecting the absolute position is required to be equipped.

FIG. 40 is a perspective view showing an optical encoder for detecting the absolute position in an incremental type encoder. This encoder is constructed as a transmissive optical encoder having a light source 1 such as an LED, a collimator lens 2 for converting a light flux from the light source 1 into a parallel light flux, a main scale 3, an index scale 4 and a light receiving portion 5 including a plurality of light receiving elements.

FIG. 41 is a plan view of the main scale 3, in which a plurality of slits S1, S2, . . . , S15, . . . are arranged at regular intervals, and a slit H is provided as a marking opening in order to generate a origin point signal.

FIG. 42 is a plan view of the index scale 4, in which an opening pattern provided for generating incremental A and B phase signals is shown. Windows W1, W2, W3 and W4, each of which has three slit-like openings, are arranged with a spatial mutual phase difference of 90 degree. A window WH is associated with the origin marking opening H of the main scale 3.

FIG. 43 shows a light receiving portion 5, in which photodiodes P1, P2, P3 and P4 are provided for receiving light having been passed through the windows W1, W2, W3 and W4 respectively. A photodiode PH is associated with the origin marking opening H of the main scale 3. When the positions of openings of the main scale 3 and the index scale are aligned, light from the light source passes through them and received by the light receiving element.

FIG. 44 shows statuses a, b, c and d in a process through which the main scale 3 moves relative to the index scale at ¼ pitch displacement steps. The overlapping state of the openings of the index scale and the slits S of the main scale gradually changes through statuses a to d, and the result of the change is detected by the light receiving element 5. FIG. 45 shows the output signals of the photodiodes P1 to P4 and PH in the statuses a to d shown in FIG. 44.

In the conventional arrangement as described above, it is necessary to provide an additional light receiving element designed for detecting the origin marking opening H. This invites an increase in the size of the element. In addition, it is necessary in this origin detection method to provide a light receiving element for generating an original point signal. It also suffers from the problem that the phase relationship relative to the incremental phase is broken by an azimuth displacement of the main scale 3 about the optical axis of the light source 1 as the rotation axis.

SUMMARY OF THE INVENTION

An object of the present invention is to solve the above-described problems and to provide an optical encoder that can detect the absolute position of the main scale by providing a discontinuous portion on the main scale or a member annexed to the main scale.

An optical encoder according to the present invention that is intended to achieve the above object comprises a main scale on which light transmitting portions or light reflecting portions are consecutively arranged, a light receiving portions adapted to be movable relative to said main scale and having a plurality of photodiodes disposed in association with said light transmitting portions or light reflecting portions, a light emitting portions for casting light to said light receiving portion through said main scale, wherein a portion that is optically discontinuous along the direction of said relative movement is provided on said main scale or an annexed member that moves together with said main scale.

With the optical encoder according to the present invention in which the discontinuous portion is provided on the main scale or a member annexed thereto, detection of the absolute position can be made possible. In addition, a light receiving element for detecting the original point can be eliminated, and a very compact encoder device can be realized.

DESCRIPTION OF THE PREFERRED EMBODIMENTS

The present invention will be described in detail based on embodiments shown in FIGS. 1 to 39.

Embodiment 1

Figure 1:
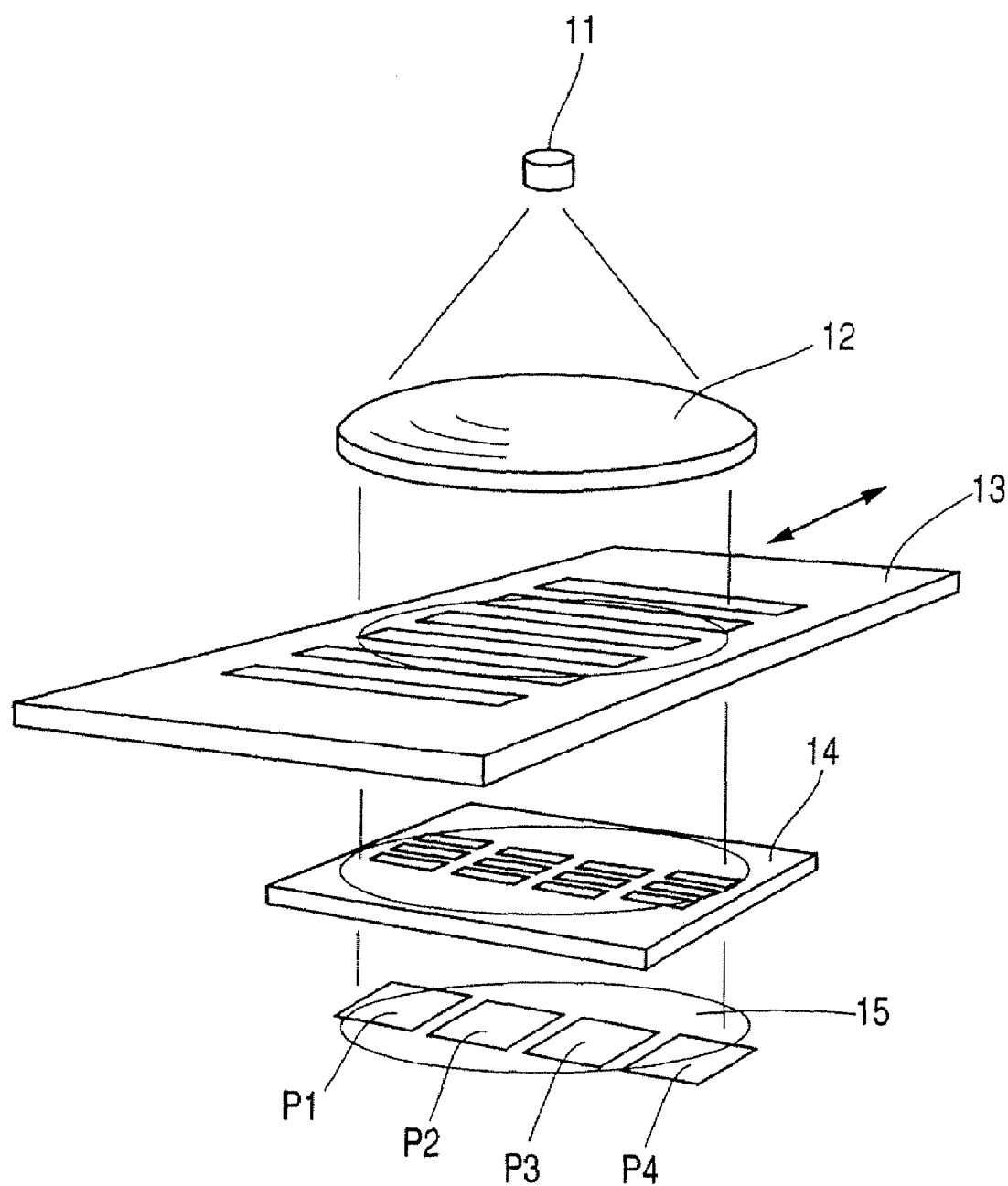
FIG. 1 is a perspective view showing an optical encoder according to embodiment 1.

FIG. 1 is a perspective view showing a first embodiment of an optical encoder, in which a collimator lens 12, a main scale 13, an index scale 14 and a light receiving portion 15 on which a plurality of photodiodes P are arrayed are arranged in order. The main scale 13 is adapted to be movable relative to the other optical components in the direction indicated by an arrow.

Figure 2:
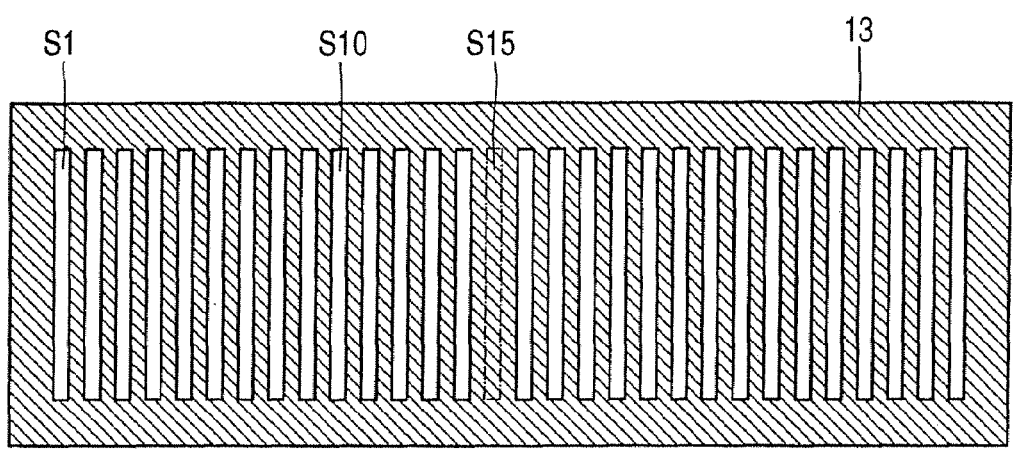
FIG. 2 is a plan view showing a main scale.

FIG. 2 is a plan view of the main scale 13. On the main scale 13, there are rectangular slits S1, ..., S10, ... arranged at regular intervals. However, only slit 15 is designed as a non-transmissive area for light, used for origin detection.

Figure 3:
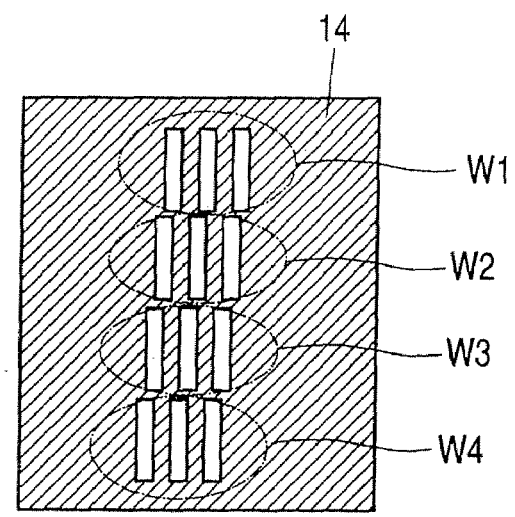
FIG. 3 is a plan view showing an index scale.

FIG. 3 is a plan view of the index scale 14. The index scale 14 has four sets of windows W1, W2, W3 and W4 formed thereon, each window set including three rectangular openings the length of which is shorter than the length of the slits S on the main scale 13. The openings are arranged along the direction same as the direction of the arrangement of the slits S on the main scale 13. The windows W1, W2, W3 and W4 are arranged along the longitudinal direction of the openings with a phase difference of ¼ P between the adjacent windows.

With this arrangement, it is possible to generate signals with phase differences of 90 degrees in accordance with displacement of the main scale 13. The arrangement direction of the four photodiodes P1 to P4 of the light receiving portion 15 is oriented in the longitudinal direction of the slits S on the main scale 13 and the openings on the index scale 14.

Figure 4:
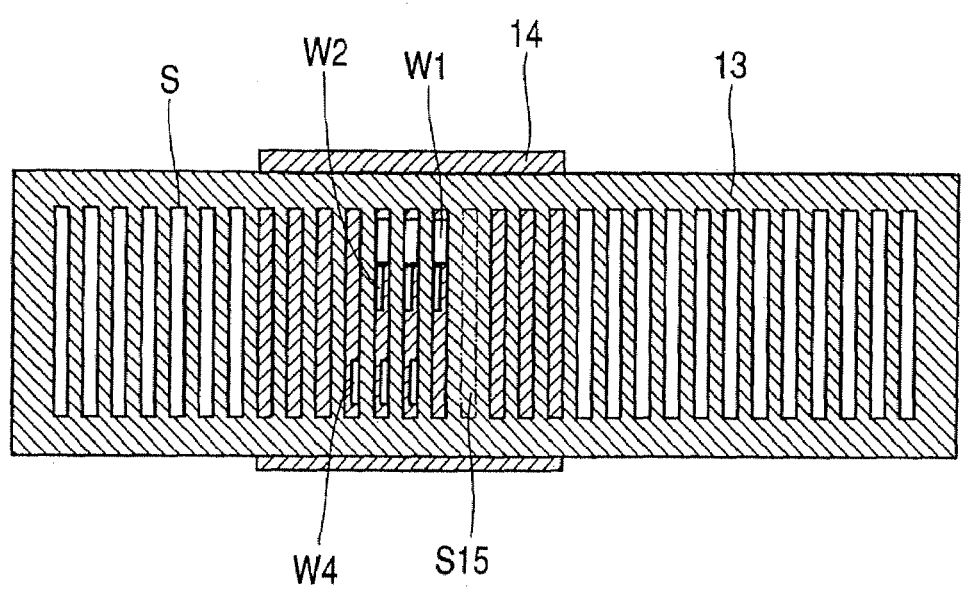
FIG. 4 a plan view showing how the main scale and the index scale overlap with each other.

A diverging light flux from the light source 11 is converted by the collimator lens 12 into a parallel light flux to illuminate the main scale 13. FIG. 4 is a plan view showing how the main scale 13 and the index scale 14 overlap as seen from the light source 11 side. The light flux having passed through slits S of the main scale 13 reaches the index scale 14, and a part of the light flux passes through the windows W1, W2, W3, W4 of the index scale 14 and enters the photodiodes P1, P2, P3, P4 of the light receiving portion 15. The quantity of the light passing through the index scale 14 changes with the shift of the main scale 13.

Figure 5:
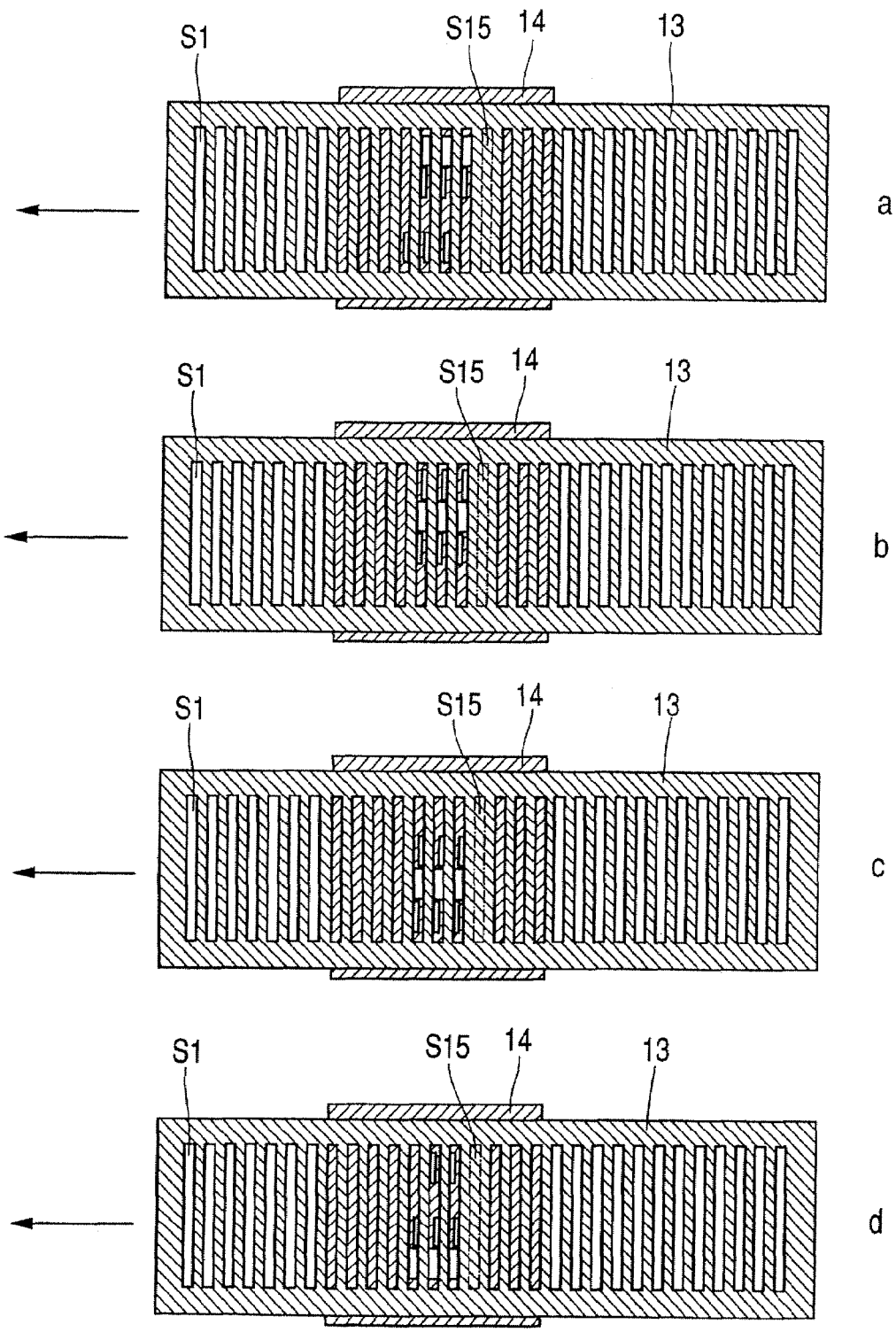
FIG. 5 illustrates overlapping statuses of the index scale and the main scale.

FIG. 5 shows statuses a to d in the process through which the main scale 13 on which a missing (or absent) slit S15 is provided shifts relative to the index scale 14.

Figure 6:
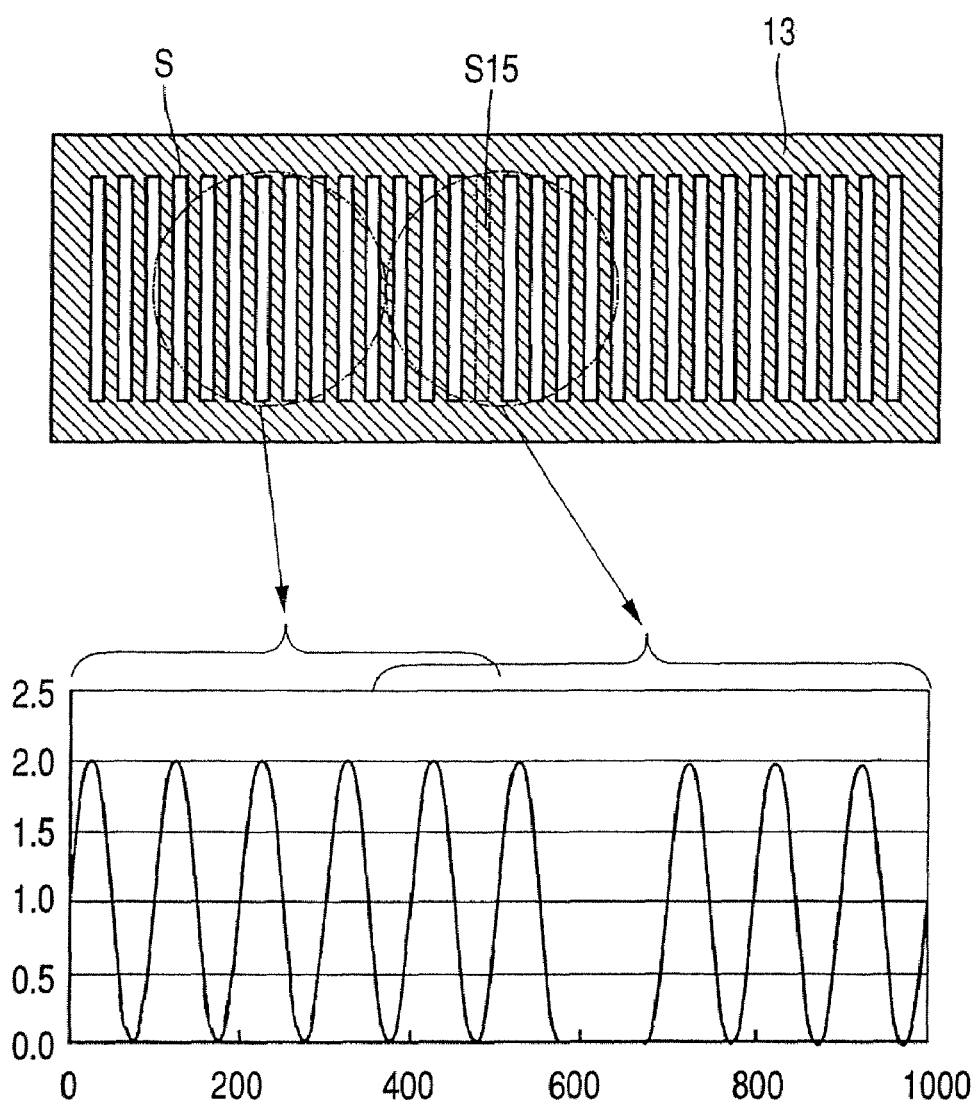
FIG. 6 shows light intensity distribution on the index scale.

FIG. 6 shows a light intensity distribution formed on the index scale 14 by the light fluxes having passed through the slits S of the main scale 13. Irregularity is seen in the light intensity distribution cycle of the transmitted light fluxes at the portion corresponding to the missing slit S15.

Figure 7:
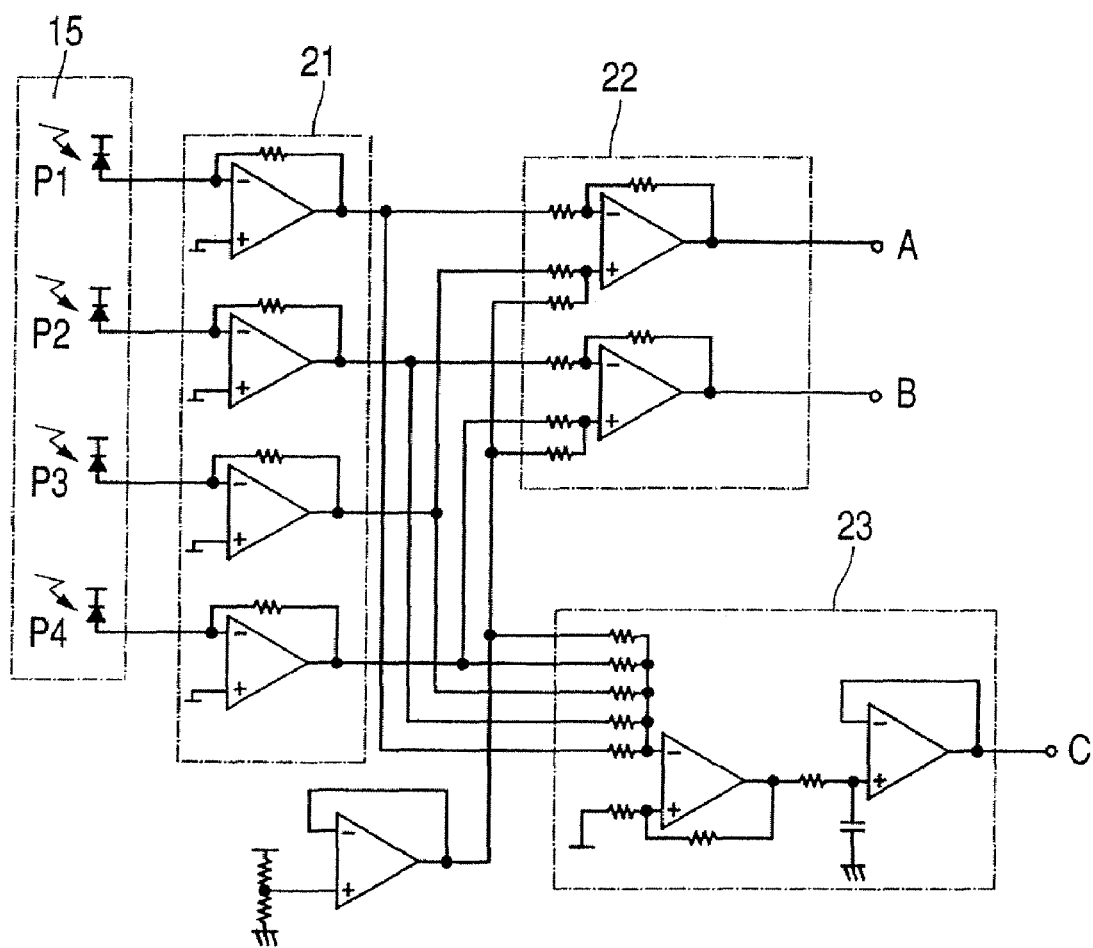
FIG. 7 is a circuit diagram of a processing circuit.

FIG. 7 is a circuit diagram of a processing circuit. Currents corresponding to the received light quantities obtained from the photodiodes P1 to P4 of the light receiving portion 15 are converted into voltages by current/voltage circuits 21. The signals after the conversion are differentially input to differential amplifiers 22, so that encoder signals A and B are obtained. The sum signal of the photodiodes P1 to P4 is output from an addition circuit 23.

Figure 8:
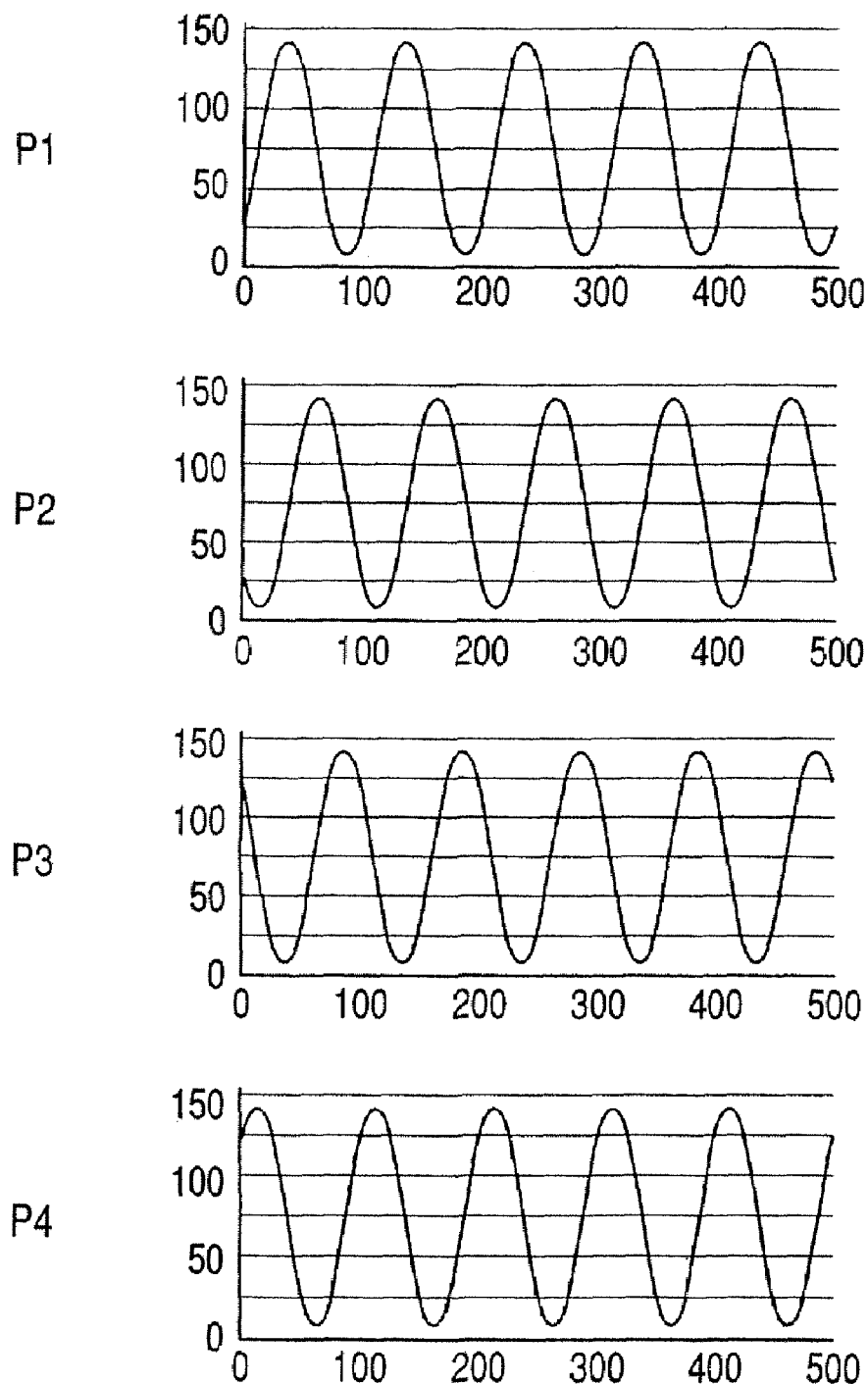
FIG. 8 shows waveforms of a current/voltage circuit in a range where there is no missing (or absent) portion.
Figure 9:
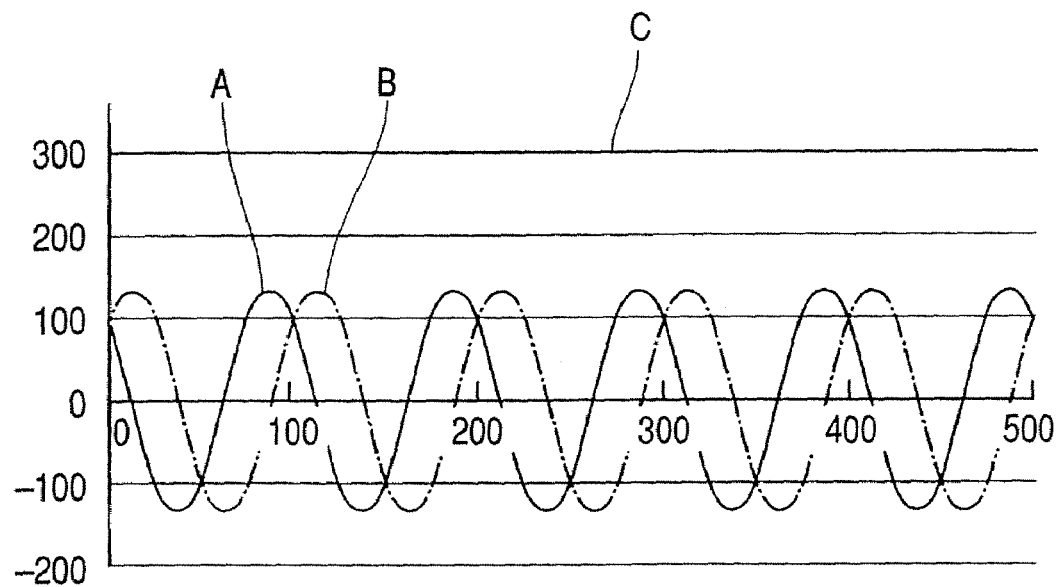
FIG. 9 shows waveforms of output signals A and B of a differential amplifier and a signal of an addition circuit.

FIG. 8 shows four output signals from the current/voltage circuits 21. The output signals represent the relationship of the output phase differences of the photodiodes P1, P2, P3 and p4 corresponding to the windows W1, W2, W3 and W4, in accordance with the position of the windows W of the index scale 14. As the resultant output of the differential amplifiers 22 (P1-P3), (P2-P4), signals A and B having a phase difference of 90 degree shown in FIG. 9 are obtained. The sum signal C is at a constant value irrespective of the shift of the main scale 13.

Figure 10:
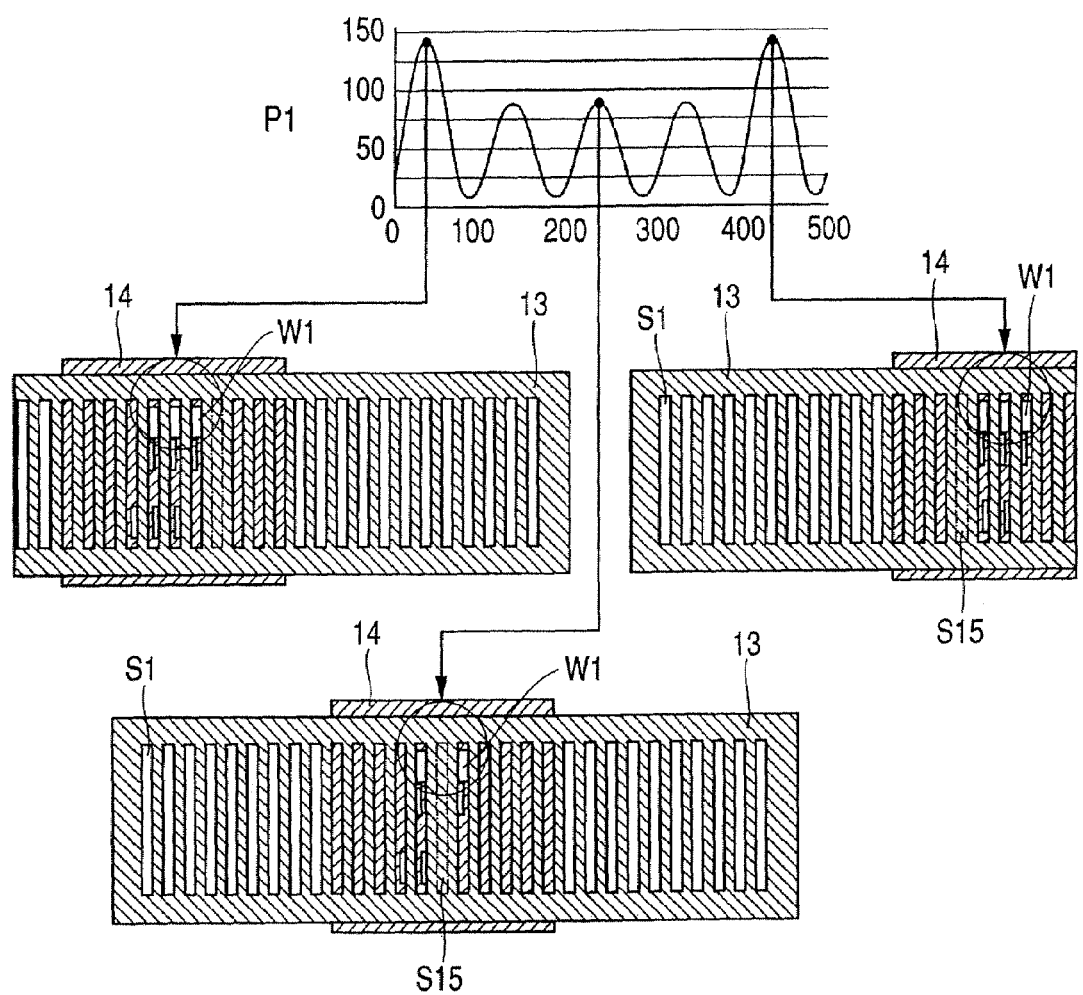
FIG. 10 shows an output signal waveform of the current/voltage circuit at the time when a slit missing portion passes.

FIG. 10 shows an output of the photodiode P1 in the case where the missing slit S15 of the main scale 13 overlaps the index scale 14. In FIG. 10, the output is shown in a manner focusing on its relationship with the window W1. Since a certain quantity of light from the missing slit 15, which would be naturally present if the missing slit 15 is an ordinary slit, fails to reach the photodiode P1, the light passes through only two of the three openings of the window W1. Thus, the average voltage level of the signal decreases by ⅓, which corresponds to the missing light quantity for one slit, so that the signal amplitude and the DC level become as low as ⅔ of the standard value.

Figure 11:
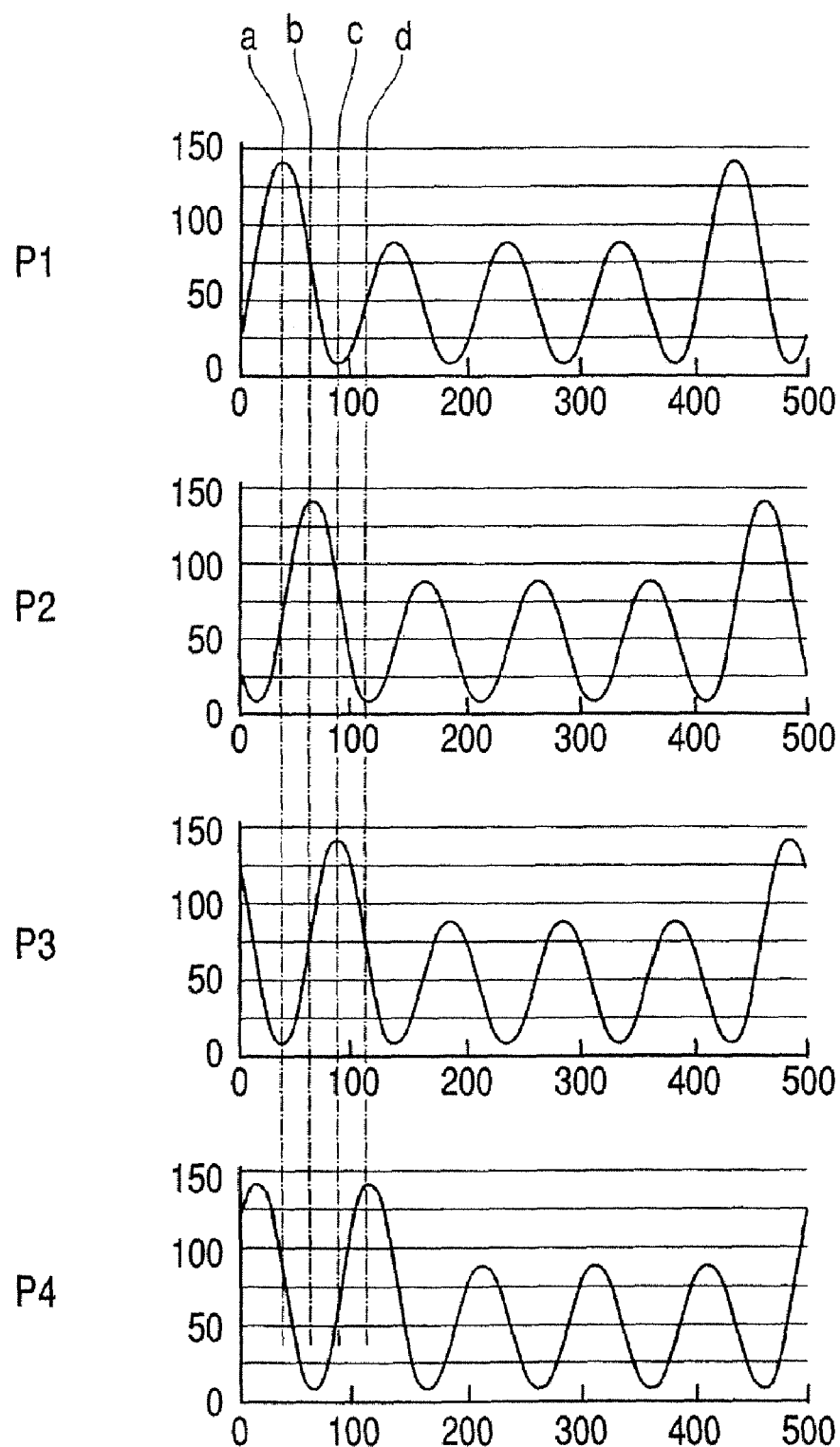
FIG. 11 shows four output signal waveforms of the current/voltage circuit at the time when a slit missing portion passes.

FIG. 11 shows a relationship of the phase of the output signals of the four photodiode P1 to P4 as the missing slit S15 passes over the index scale 14. Since the timings with which the missing slit 15 passes over the windows W1 to W4 have phase differences of 90 degrees, the outputs of the photodiodes P1 to P4 have the waveforms as shown in FIG. 11.

Figure 12:
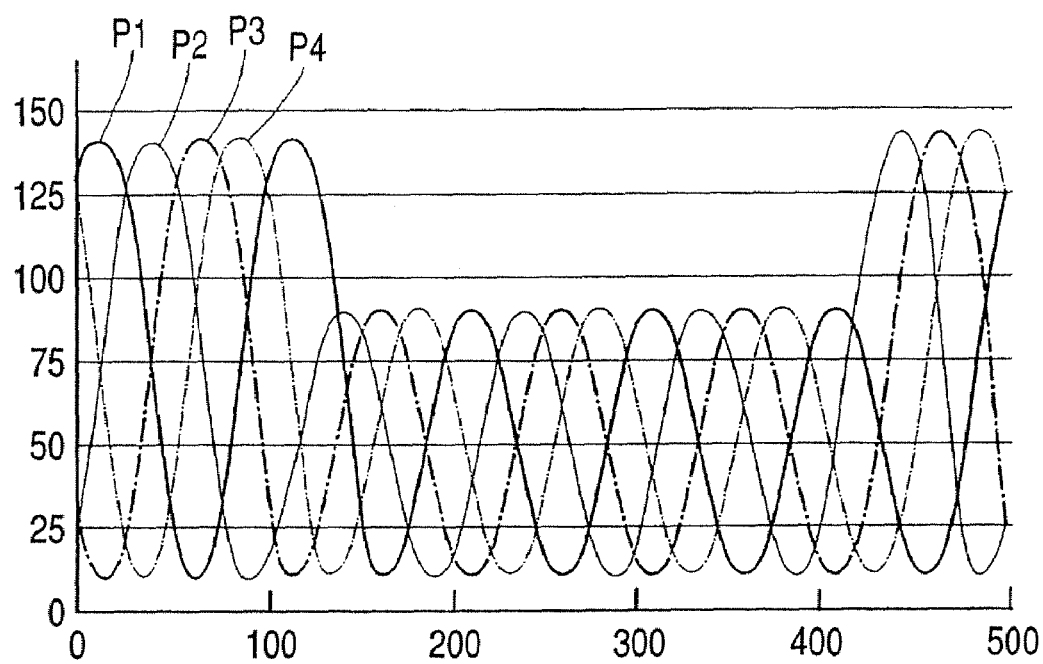
FIG. 12 is a waveform chart in which four outputs of the current/voltage circuit at the time when a slit missing portion passes are superimposed.
Figure 13:
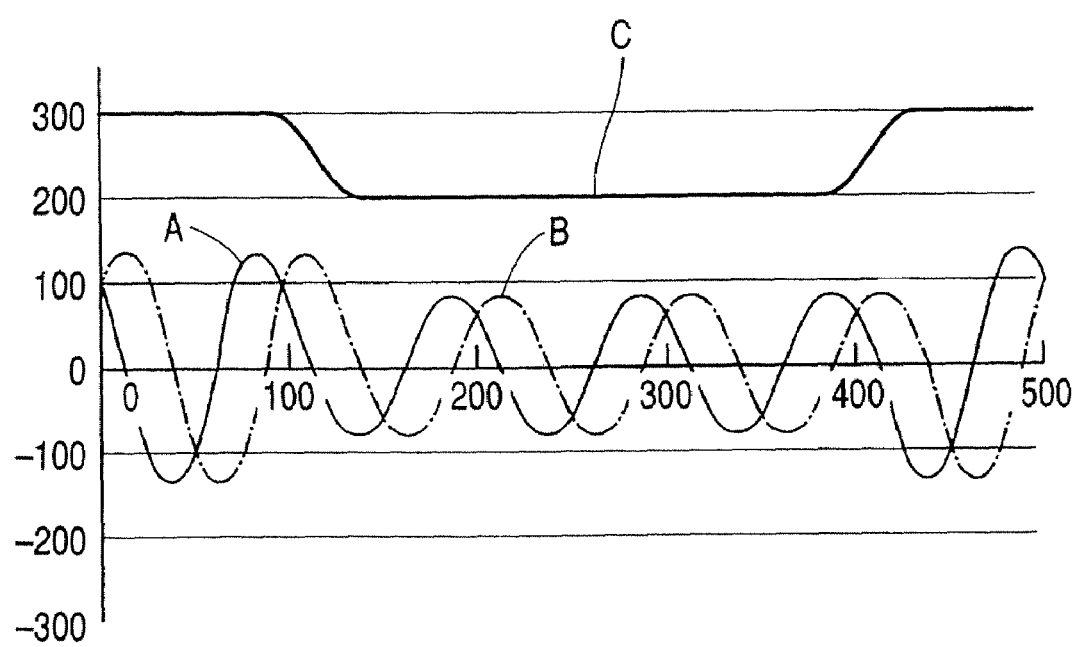
FIG. 13 shows output waveforms A, B of the differential amplifier and the signal C of the addition circuit at the time when a slit missing portion passes.

FIG. 12 is a waveform diagram in which all the four signals of the photodiodes P1 to P4 are superimposed, and FIG. 13 shows changes in the outputs A, B of the differential amplifiers 22 and the sum signal C as the output of the addition circuit 23 at that time.

As shown in FIG. 13, the sum signal C of the received light quantity decreases down to approximately ⅔ over a period corresponding to three cycles of the output waveform or the number of the openings of the index scale 14, due to the presence of the missing slit S15. At the same time, the amplitude of the output signals A and B of the differential amplifiers 22 also decreases. The point at which the sum signal C changes can be used as an original point signal.

Figure 14:
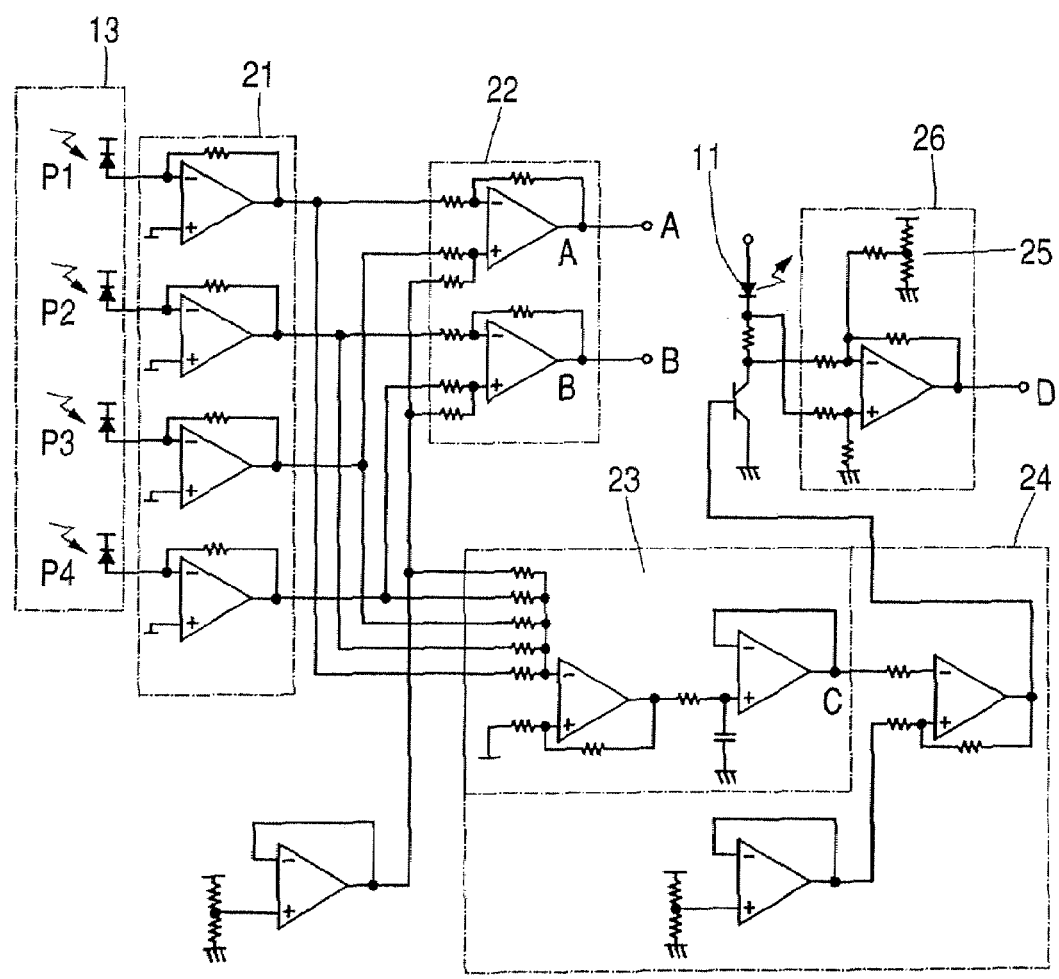
FIG. 14 is a circuit diagram showing an modification of the processing circuit.

A more improved method is a modification in the form of the signal processing circuit shown in FIG. 14, with which the aforementioned changing point can be detected while preventing a decrease in the amplitude of the output signals A and B of the differential amplifiers 22.

In this circuit, the output of the addition circuit 23 is compared with a reference voltage in the feedback circuit 24, and a feedback control is performed so that the light emission quantity of the light source 11 becomes a predetermined light quantity. The value of the current flowing through the light source 11 is detected as a voltage signal D by a current detection circuit 26 equipped with an offset elimination circuit 25. In order to detect a change in the current at the time when the missing slit S15 of the main scale 13 passes at a large scale, the current detection circuit 26 is designed to increase the gain to enlarge the changing portion while removing the bias portion of the light quantity.

In the circuit arrangement shown in FIG. 14, when the missing slit S15 passes over the photodiodes P1 to P4, the light quantity received by the light receiving portion is decreased. In view of this, the current flowing through the light source 11 is increased by the feedback circuit 24 so that the light quantity received by the light receiving portion 15 is made constant. With such a circuit arrangement, stable encoder signals A and B that do not suffer from changes in the signal amplitude in spite of the presence of the missing slit S15.

Figure 15:
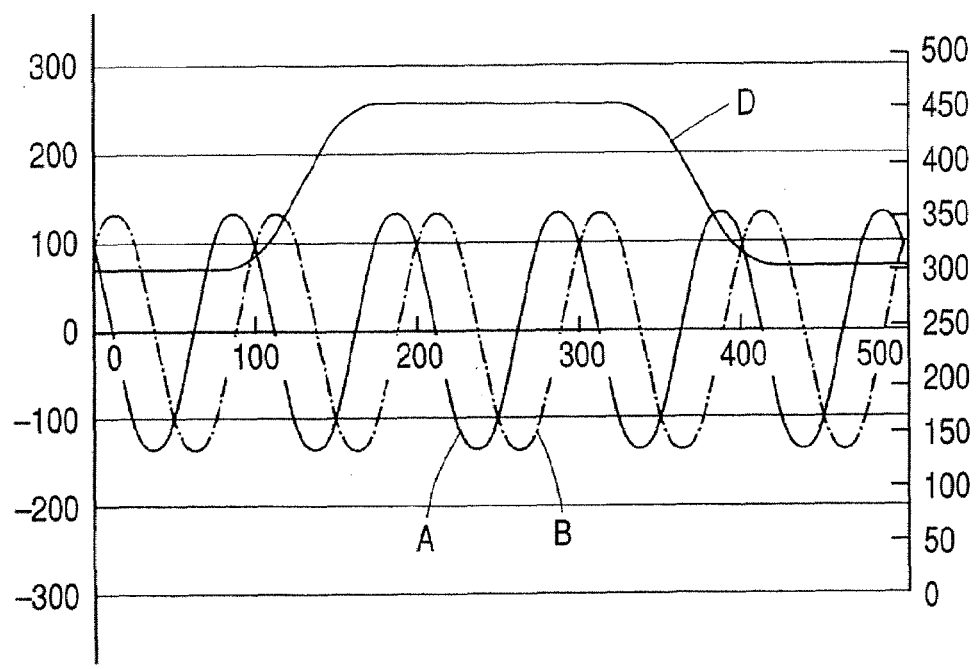
FIG. 15 shows output waveforms A, B of the differential amplifier and the signal C of the addition circuit at the time when a slit missing portion passes.
Figure 16:
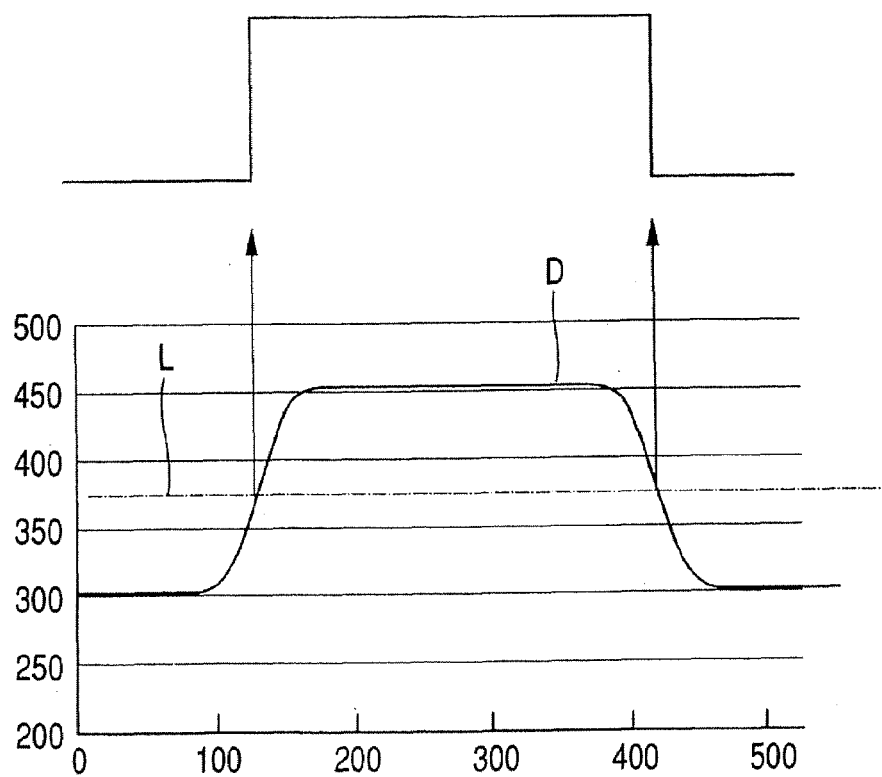
FIG. 16 shows an original point signal obtained from the signal D.

FIG. 15 shows the signal D obtained by the current detection circuit 26 and the encoder signals A and B obtained by the differential amplifiers 22 at the time when the missing slit S15 of the main scale 13 passes, where it is assumed that the light receiving portion 15 has a width corresponding to eight slits. It will be seen that changes in the amplitude of the signals A and B are little and the signal D changes at a singular point of the missing slit S15 of the main scale, i.e. at the position of the original point. Accordingly, as shown in FIG. 16, it is possible to obtain a rectangular wave signal and use pulse edges there of so as to serve as an original point signal, by comparing the signal D with a reference voltage L in an appropriate manner using a comparator.

Embodiment 2

Figure 17:
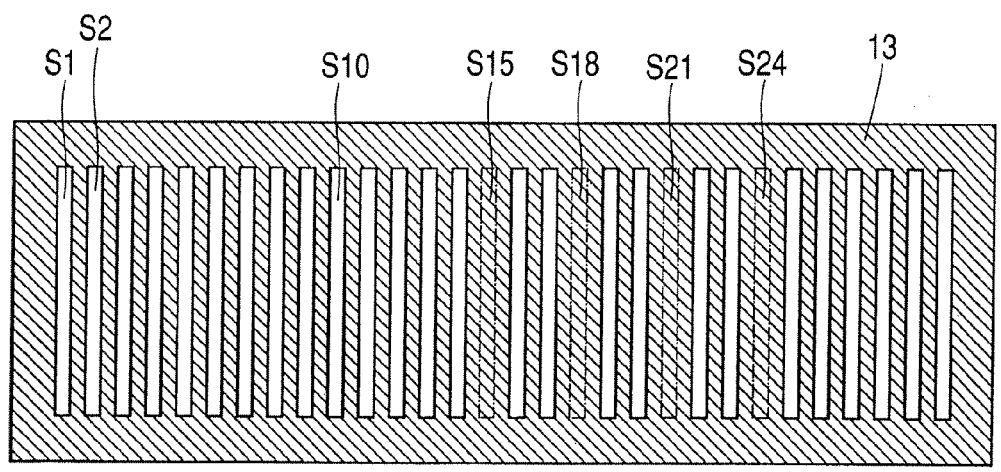
FIG. 17 is a plan view showing a main scale according to embodiment 2.

FIG. 17 shows a main scale 13 according to embodiment 2. Contrary to embodiment 1, in this embodiment 2 the number of the missing slit S is not one, but missing slits S18, S21 and S24 are provided in addition to the slit S15 with two slit intervals.

Figure 18:
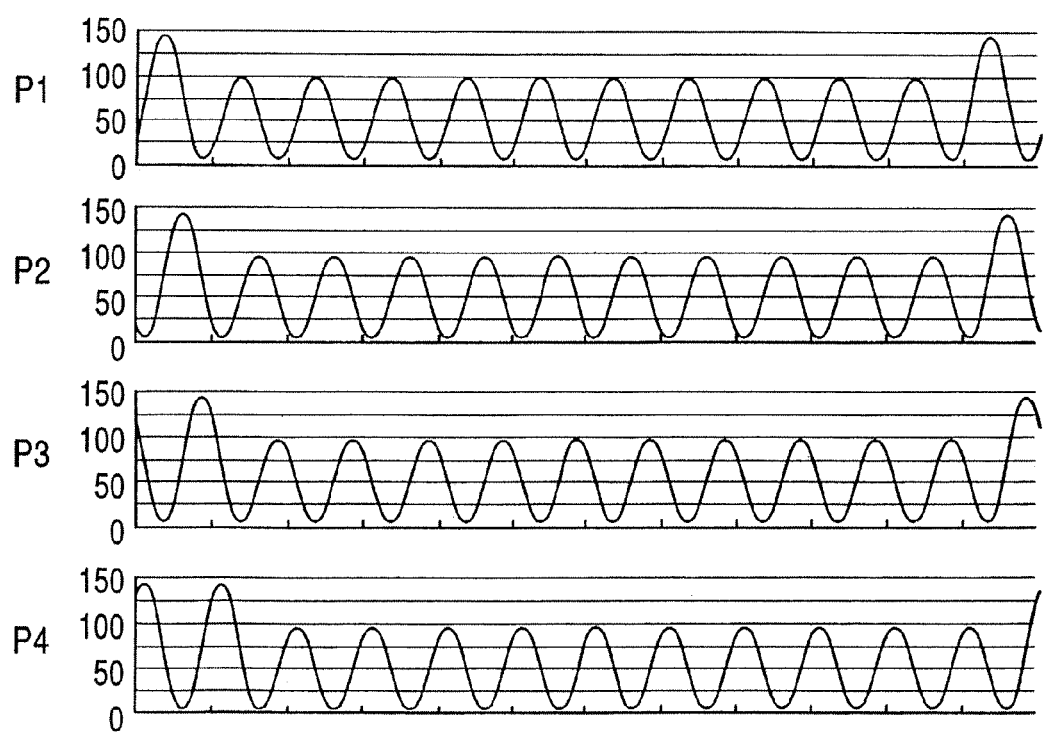
FIG. 18 shows four output signal waveforms of the current/voltage circuit at the time when a slit missing portion passes.

Signals shown in FIG. 18 are obtained from the photodiodes P1 to P4. Such signals can be effectively used in defining a certain large area instead of the original point signal. In this case, it is possible to define an area corresponding to ten cycle of the output signals.

Embodiment 3

Figure 19:
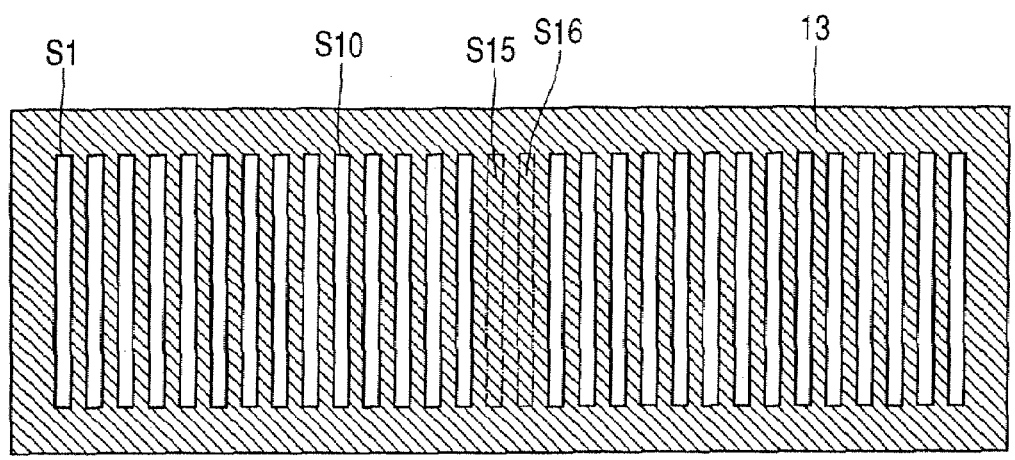
FIG. 19 is a plan view showing a main scale according to embodiment 3.

In embodiment 3 shown in FIG. 19, missing portions on the main scale 13 are provided as consecutive missing slits S15 and S16. Each of the windows W1, W2, W3, W4 of the index scale includes three opening in a set as shown in FIG. 2. Accordingly, even though there are two consecutive missing slits S15, S16, light can be received through the remaining one opening of the window W, and the signals A, B of the incremental phase will not be nullified.

Figure 20:
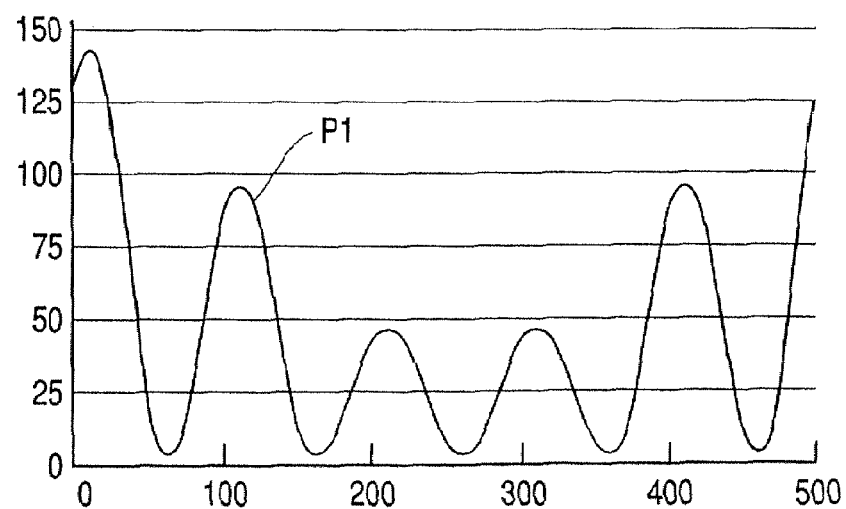
FIG. 20 shows an output signal waveform of the current/voltage circuit at the time when a slit missing portion passes.
Figure 21:
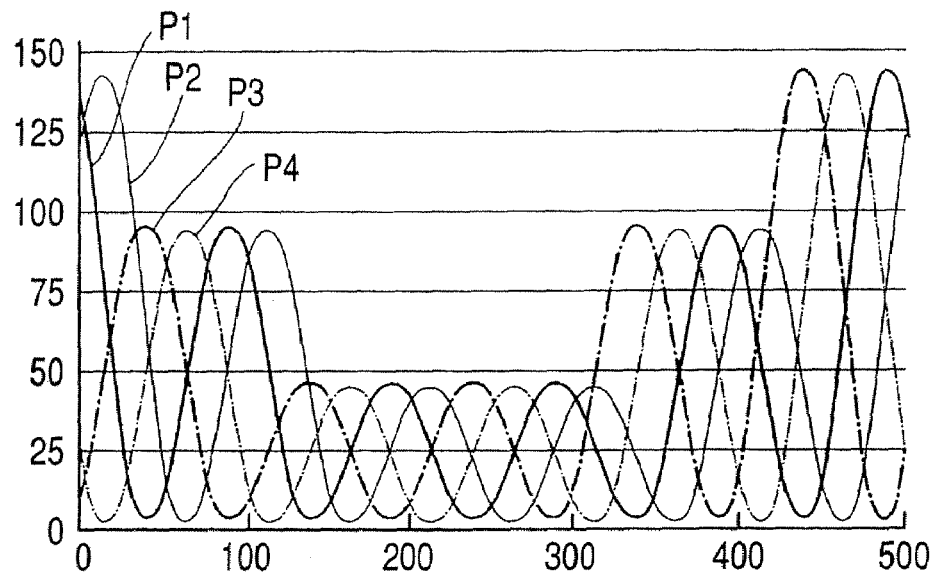
FIG. 21 is a waveform chart in which four outputs of the current/voltage circuit at the time when a slit missing portion passes are superimposed.
Figure 22:
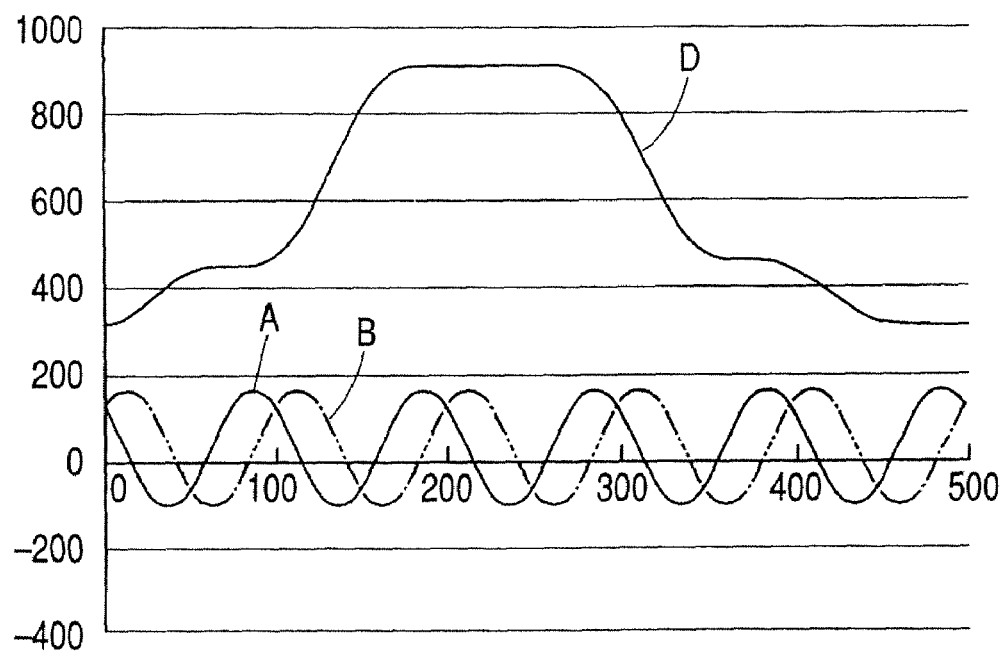
FIG. 22 shows output waveforms A, B of the differential amplifier and the signal D of the current/voltage circuit at the time when a slit missing portion passes.

FIGS. 20 and 21 show an output of one photodiode P1 and outputs of the four photodiodes P1 to P4. In the state in which two of the three openings of the window W are blanketed, the output is decreased down to ⅓ of the standard value. However, when the signal processing circuit shown in FIG. 14 is applied, a changing point of the current of the light source 11 can be determined while maintaining the amplitude of the signals A and B stable and the output signal D of the current detection circuit 26 can be used as an original point signal.

Embodiment 4

Figure 23:
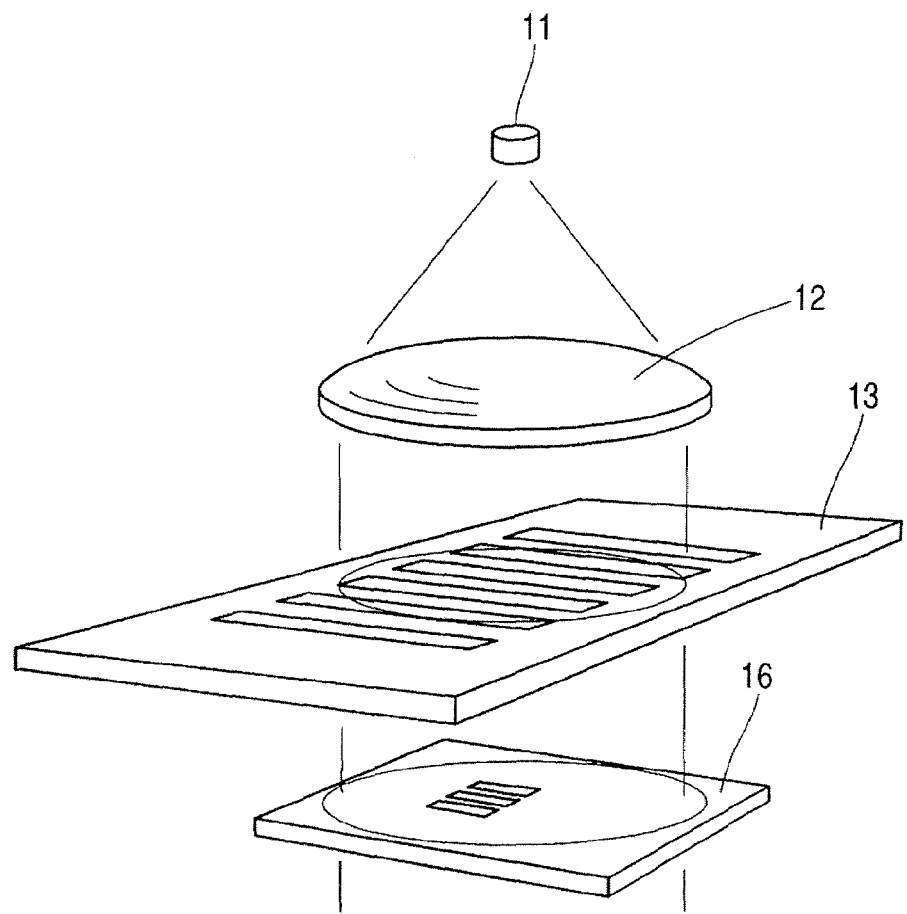
FIG. 23 is a perspective view showing an optical encoder according to embodiment 4.

While in embodiment 1 the index scale 14 and the light receiving portion 15 are provided as separate portions, in embodiment 4, a photodiode array 16 in which an index scale 14 and a light receiving portion 15 are integrated is used as shown in FIG. 23

Figure 24:
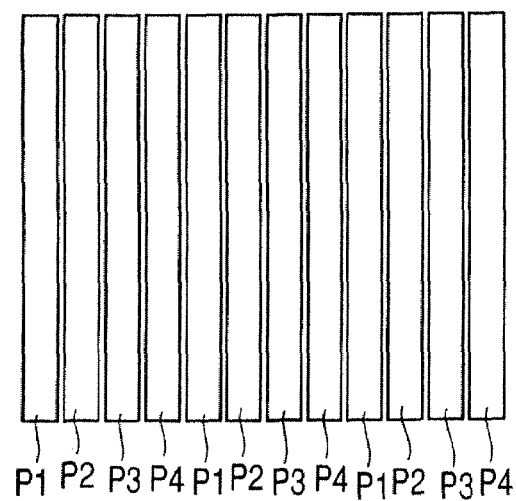
FIG. 24 is a plan view showing a photodiode array in embodiment 4

FIG. 24 shows an arrangement of the photodiode array 16, in which photodiodes P1, P2, P3, P4 as light receiving elements are arranged regularly in a repeating manner to achieve relationship of 0°, 90°, 180° and 270°. Thus, light receiving signals similar to those in embodiment 1 can be obtained. Use of this photodiode array makes it possible to achieve original point detection with improved accuracy. In contrast to embodiment 1 in which it is difficult to effectively receive illumination light from the light source 11, in this photodiode array 16 it is possible to dispose the light receiving portion 15 at substantially the center of the optical axis of the light source.

Embodiment 5

Figure 25:
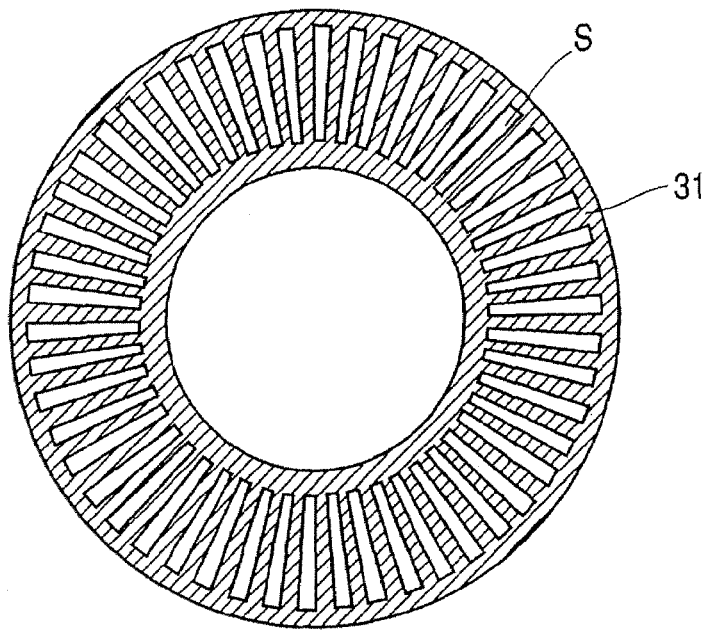
FIG. 25 is a plan view showing a conventional rotary type main scale.
Figure 26:
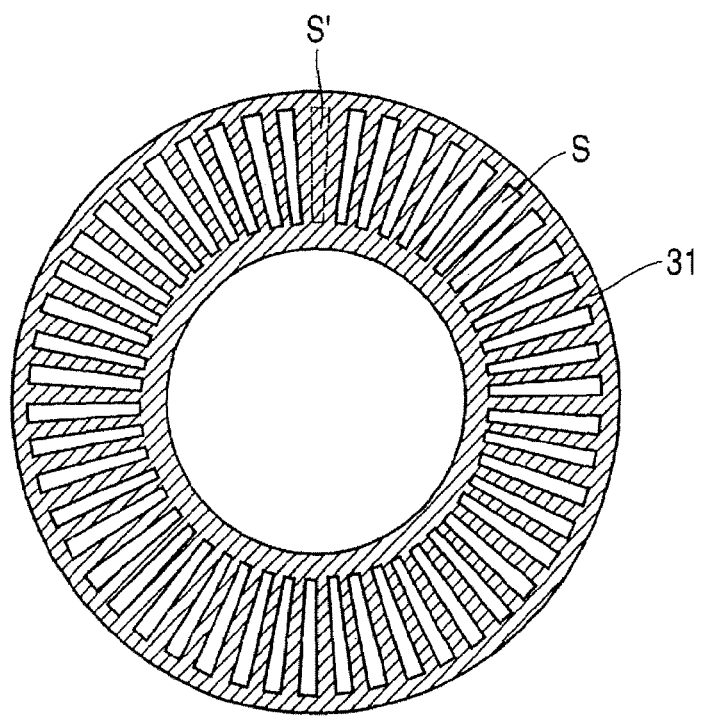
FIG. 26 is a plan view showing a rotary type main scale which is obtained by providing a missing portion in the rotary type main scale of embodiment 5.

FIG. 25 shows a main scale 31 for a conventional transmissive rotary encoder. As shown in FIG. 26, in a scale of the present invention, one missing slit S' is provided for generating an original point signal. The basic operation of this encoder is the same as that of embodiment 1, and the description thereof will be omitted.

Figure 27:
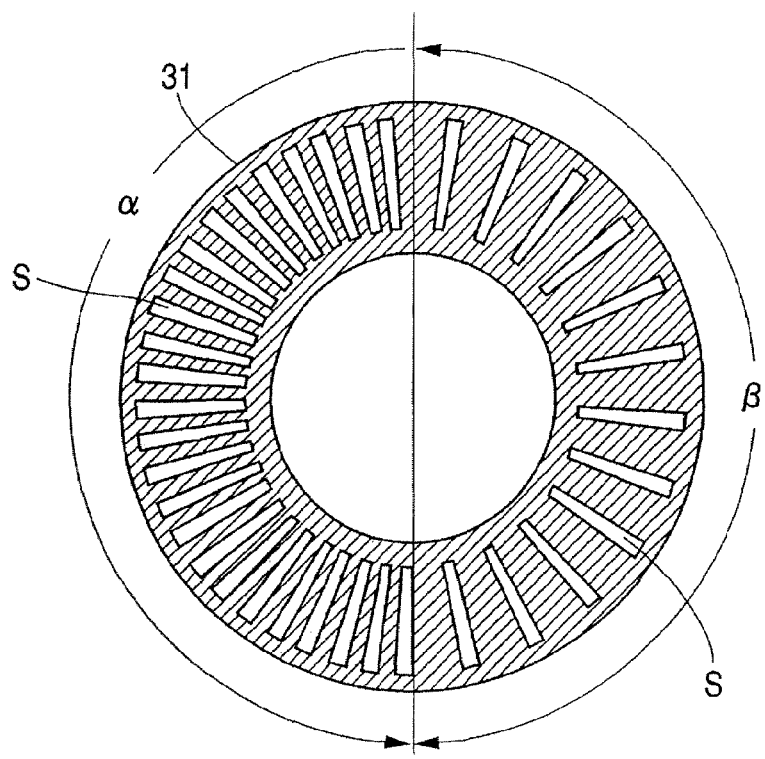
FIG. 27 is a plan view showing a main scale in which missing portions like that in embodiment 5 are provided over a specific zone.

FIG. 27 shows an example in which the arrangement of the missing slit in embodiment 2 and embodiment 3 is applied to the main scale 31. In this example, the main scale 31 is divided into two 180° areas α and β, and in area β one of every two slits is eliminated in contrast to the area α.

Figure 28:
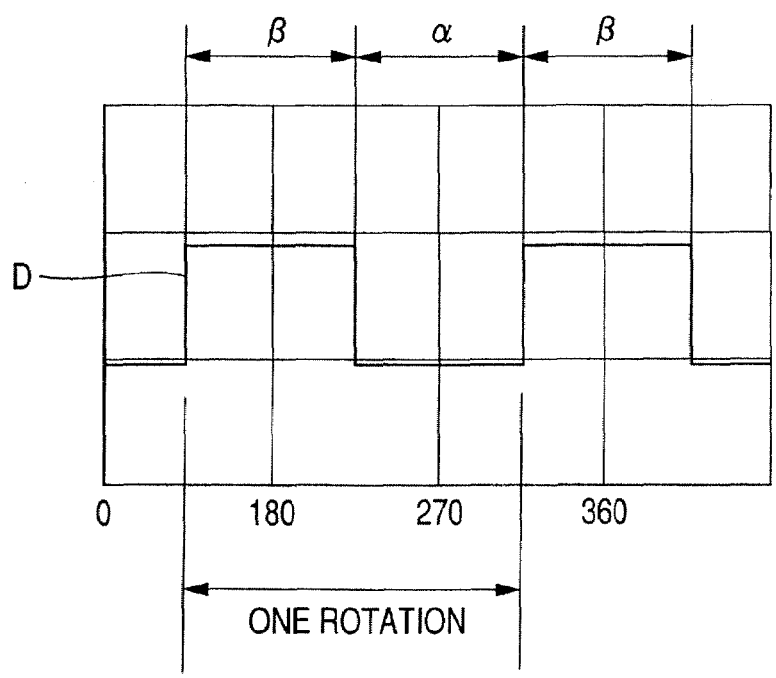
FIG. 28 shows a waveform of an original signal obtained from the signal D.

FIG. 28 shows the waveform of a rectangular wave based on the signal D from the current detection circuit 26, with which the level of the signal D can be clearly distinguished between the areas α and the area β. Accordingly, discrimination of the area areas α and β is made possible.

Figure 29:
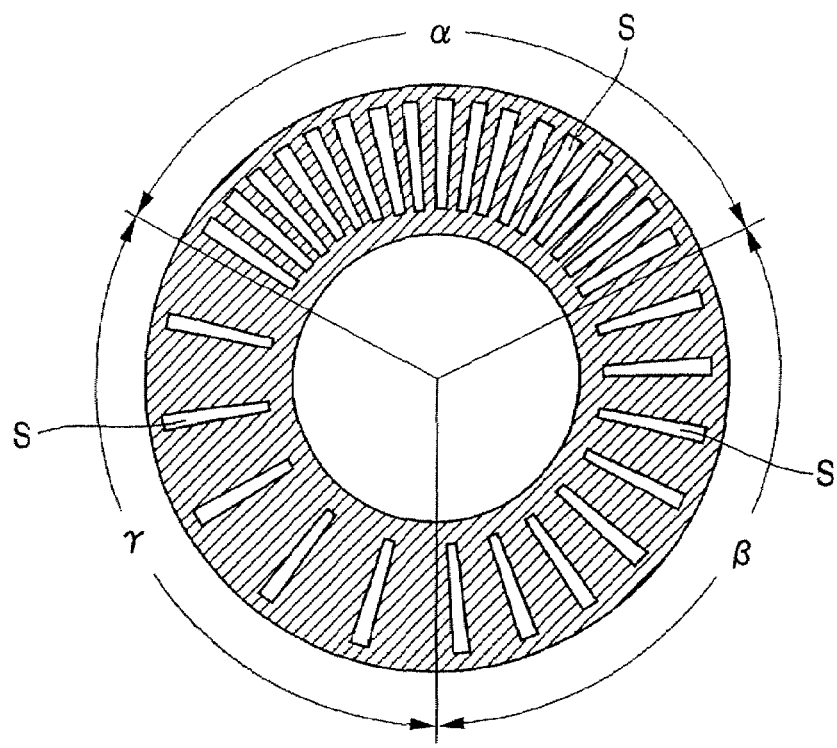
FIG. 29 is a plan view showing a main scale in which missing portions like that in embodiment 5 are provided over a specific zone.
Figure 30:
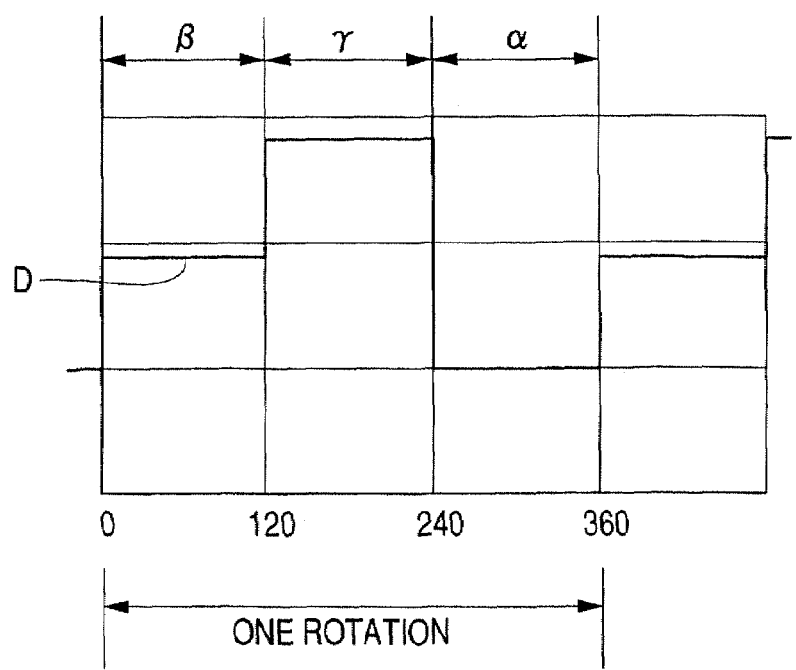
FIG. 30 shows a waveform of an original signal obtained from the signal D.

In the rotary encoder, it is necessary, for example, to generate a UVW signal (or a commutation signal) as an output signal for controlling a motor. In that case also, it is possible to define three different zones by varying the slit density in areas α, β and γ as shown in FIG. 29. Thus it is possible to replace the UVW signal. In this case, a signal D as shown in FIG. 30 is obtained.

Embodiment 6

Figure 31:
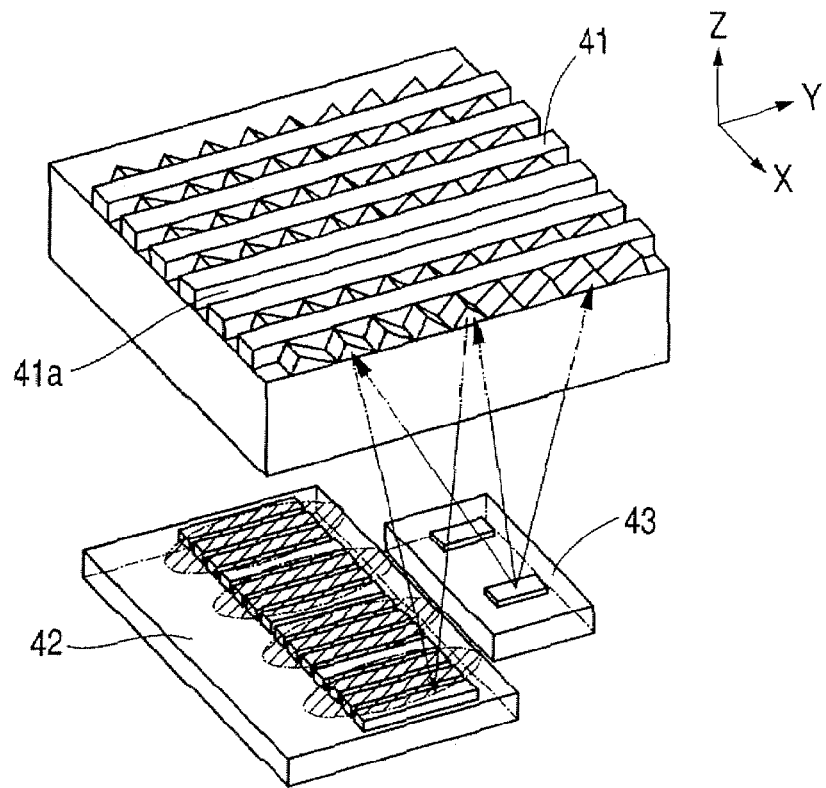
FIG. 31 shows the structure of an optical encoder according to embodiment 6.

FIG. 31 shows the structure of an optical system of a linear movement encoder according to embodiment 6. This encoder uses a main scale 41 in the form of a reflective micro roof mirror array as a moving member. With this structure, it is possible to improve utilization efficiency of light. The structure using the micro roof mirror array is disclosed in Japanese Patent Application Laid-Open No. 2002-323347. The reflecting portion of the main scale 41, which moves linearly in the X direction relative to a light receiving portion 42, is provided with a partial missing portion 41a in the form of a non-reflecting portion that interrupt continuation of the reflecting portion along the X direction.

This optical encoder is composed of a main scale 41, a light receiving portion 42 in which a plurality of photodiodes P are arranged and a light source 43, wherein light emitted from the light source 43 is reflected by the main scale 41 having reflecting portions with small intervals and non-reflecting portions, so that a light-and-shade distribution is formed on the light receiving portion.

According to this structure, in the case that the main scale 41 is not equipped with the particular micro roof mirror array but constructed as a simple structure having reflecting portions and non-reflecting portions, a similar light-and-shade distribution is formed on the light receiving portion, though the signal level is different, so that encoder signals A and B can be obtained.

Figure 32:
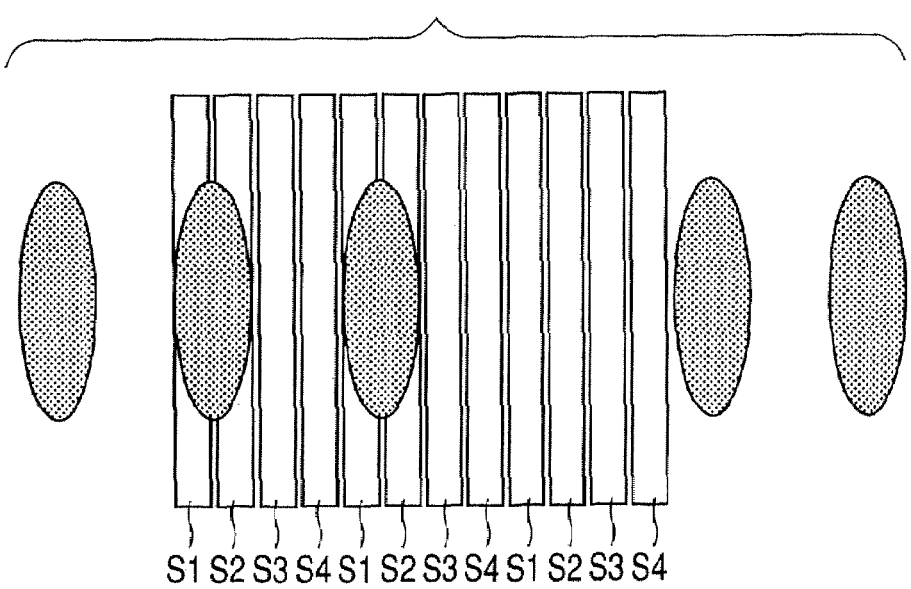
FIG. 32 illustrates a relationship between the pattern of a photodiode array and a light and shade pattern detected.

FIG. 32 illustrates the structure of a light receiving portion 42 in which a plurality of photodiodes P are arranged and a light-and-shade pattern of incident light. The photodiodes P1, P2, P3, P4 are arranged in a repeating manner to achieve relationship of 0°, 90°, 180° and 270°. Even when the light-and-shade pattern of the incident light is partially dropped due to the presence of the missing portion 41a, a signal amplitude proportional to the remaining photodiodes P can be obtained thanks to the presence of the other photodiodes P.

Figure 33:
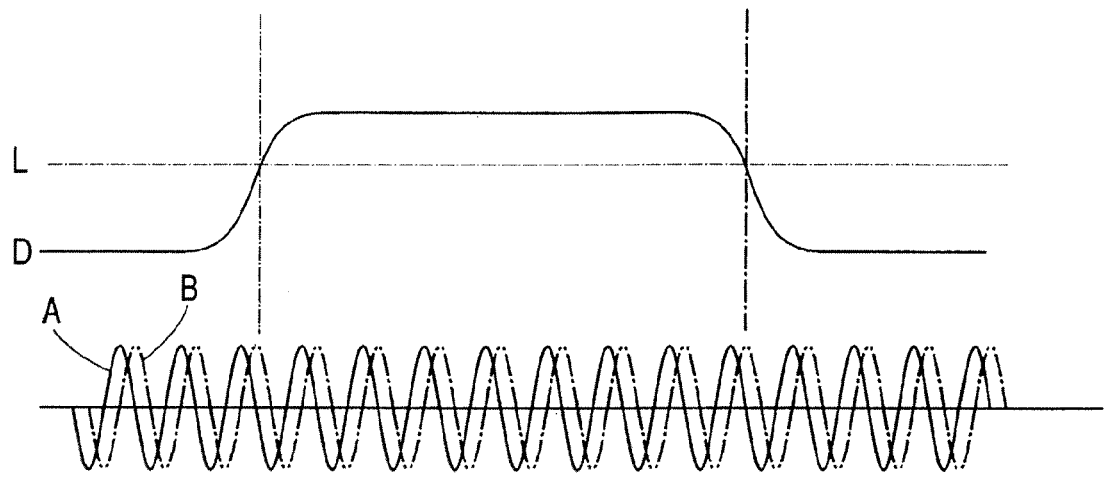
FIG. 33 shows waveforms of the outputs A, B of the differential amplifier and the output D of the current/voltage circuit.

In this embodiment 6, the circuit arrangement shown in FIG. 14 can be used, and FIG. 33 shows a signal input for the case where the photodiode P has the width corresponding to eight pulses of the slits. As will be seen from FIG. 33, in the case that there is one missing portion 41a on the main scale 41, the light quantity decreases at the time when the missing portion 41a passes over the light receiving portion 42 for the first time. Accordingly, the feedback circuit 24 functions to increase the current. Thus, the signal D of the current detection circuit 26 is increased by a ratio of about 1/8. This state is continued as long as the missing portion 41a passes over the light receiving portion 42, and when the missing portion 41a leaves the light receiving portion 42, the signal level is decreased down to the previous level.

With this structure, it is possible to detect passing of the missing portion 41a of the main scale 41 based on the signal D without changing the encoder signals A and B.

While in this embodiment the main scale 14 has one missing portion 41a, if there are two consecutive missing portions 41a, a change in the level of the signal D of the current detection circuit 26 will increase. Based on this, it is possible to detect the number of the missing portions 41a that is passing over the light receiving portion 42 from the level of the signal D. Therefore, this arrangement can be applied to detection of the absolute position by forming a special pattern on the main scale 41.

Embodiment 7

Figure 34:
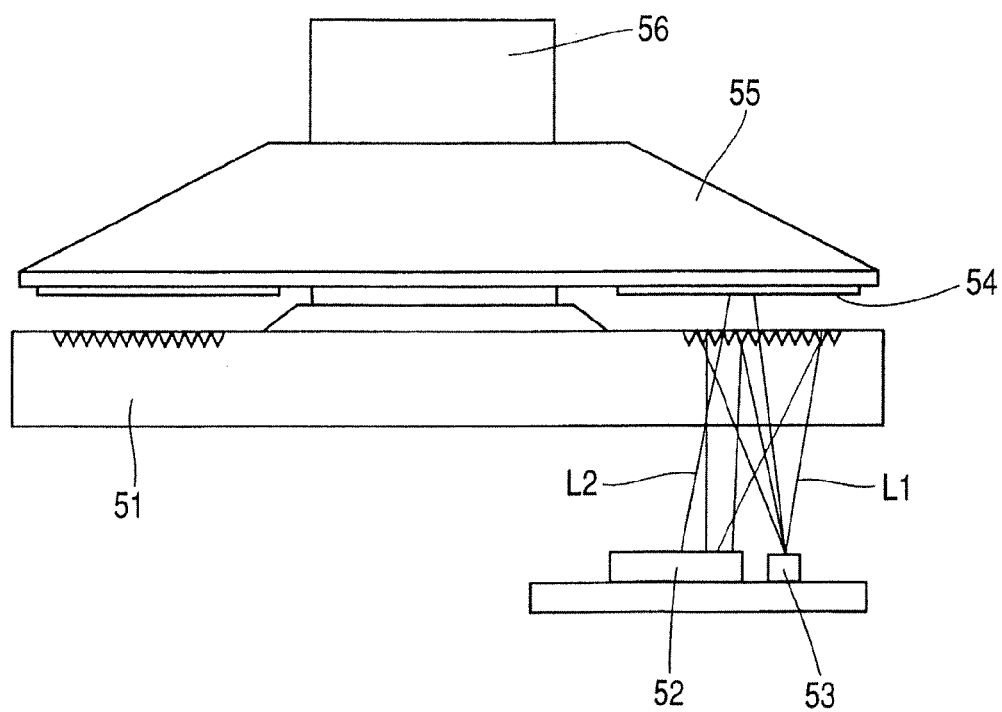
FIG. 34 shows the structure of an optical encoder according to embodiment 7.

FIG. 34 shows the optical arrangement of a transmissive main scale 51 etc. in the rotary optical encoder according to embodiment 7. The main scale 51 is not provided with a discontinuous portion, and a reflection plate having an effect of reflecting light transmitted through the main scale and returning it to a light receiving portion 52 is provided in the side of the main scale 51 that is opposite to the light receiving portion 52 and the light source 53. The reflection plate 54 is adhered to a holding member 55 and adapted to rotate together with the main scale 51a about the common rotary shaft 56.

Figure 35:
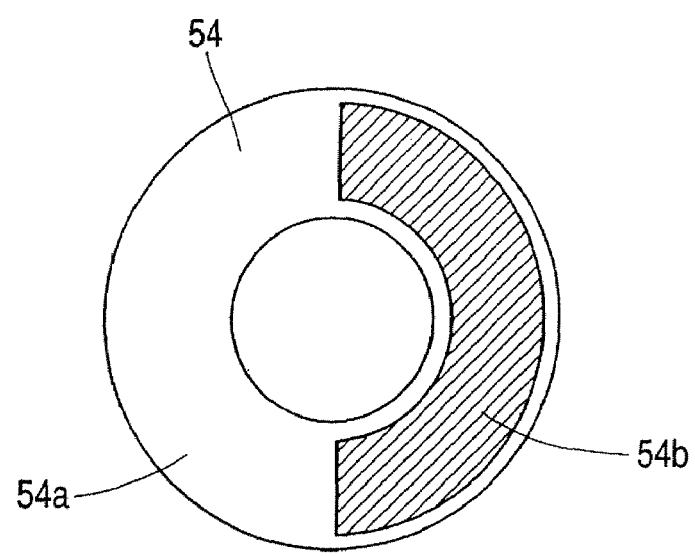
FIG. 35 is a plan view showing a reflection plate in embodiment 7.

FIG. 35 shows the pattern of the reflection plate including a reflecting portion 54a and a non-reflecting portion 54b. The reflecting portion 54a and the non-reflecting portion 54b are formed in half-and-half meniscus shapes, and the non-reflecting portion 54b serves as a discontinuous portion with respect to the rotational direction.

Light emitted from the light source 53 travels on through optical paths L1 to reach the main scale 51, then is reflected by the main scale 51 and returned to the light receiving portion to generate encoder signals A and B as position pulses. A part of the light emitted from the light source 53 passes through the main scale 51 as indicated by optical path L2, is reflected by the reflecting portion 54a of the reflection plate 54 and returned to the light receiving portion 52 after passing through the main scale 51.

The light having traveled through light path L2 is used to generate a signal for obtaining the absolute position, contrary to the encoder signals A, B. This light is DC light that is irrelevant to the reflection pattern on the main scale.

Therefore, when the reflecting portion 54a is present on the backside of the main scale 51, the light receiving portion 52 operates in the manner like in the case that DC light is incident on it. Namely, it operates to reduce the light quantity of the light source 53.

Figure 36:
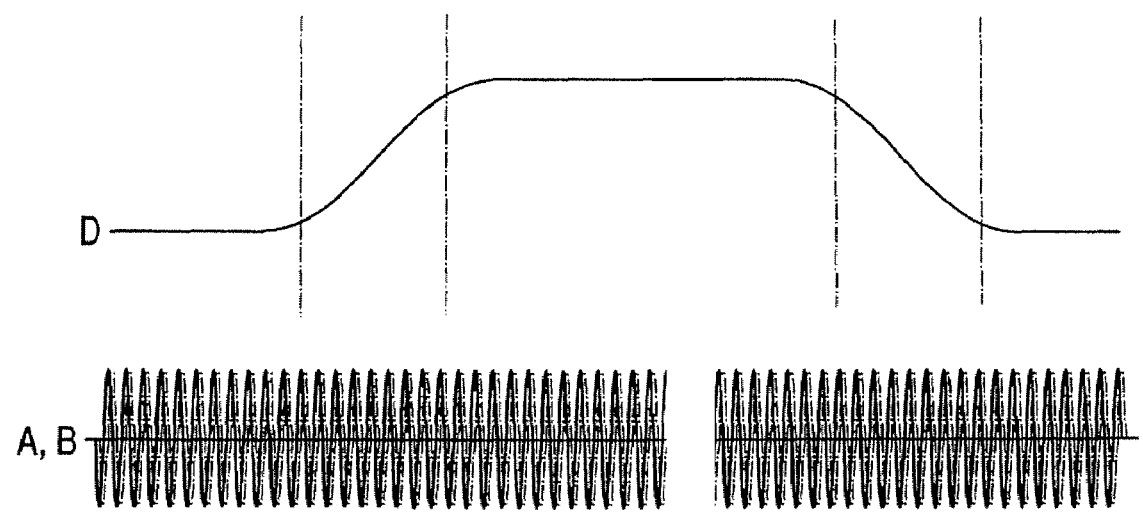
FIG. 36 shows waveforms of the outputs A, B of the differential amplifier and the output D of the current/voltage circuit.

FIG. 36 shows signals A, B and D from the circuit shown in FIG. 14 for the arrangement of embodiment 7. When the reflecting portion 54a of the reflection plate 54 comes above the light receiving portion 52, a decrease in the current of the light source 53 occurs due to the influence of the reflected light. Based on this change, position information corresponding to the absolute position can be obtained in a manner similar to in embodiment 1.

This embodiment 7 is advantageous in that absolute position information can be obtained only by providing the reflection plate 54 having a reflecting portion 54a on the backside of the main scale without modifying the main scale 51, or without providing a discontinuous portion on the main scale 51. It is also possible to change the high level period and the low level period of the signal D by changing the pattern of the reflecting and non-reflecting portions, or vary the difference of the high level and the low level by changing the reflectance of the reflection plate 54.

Embodiment 8

Figure 37:
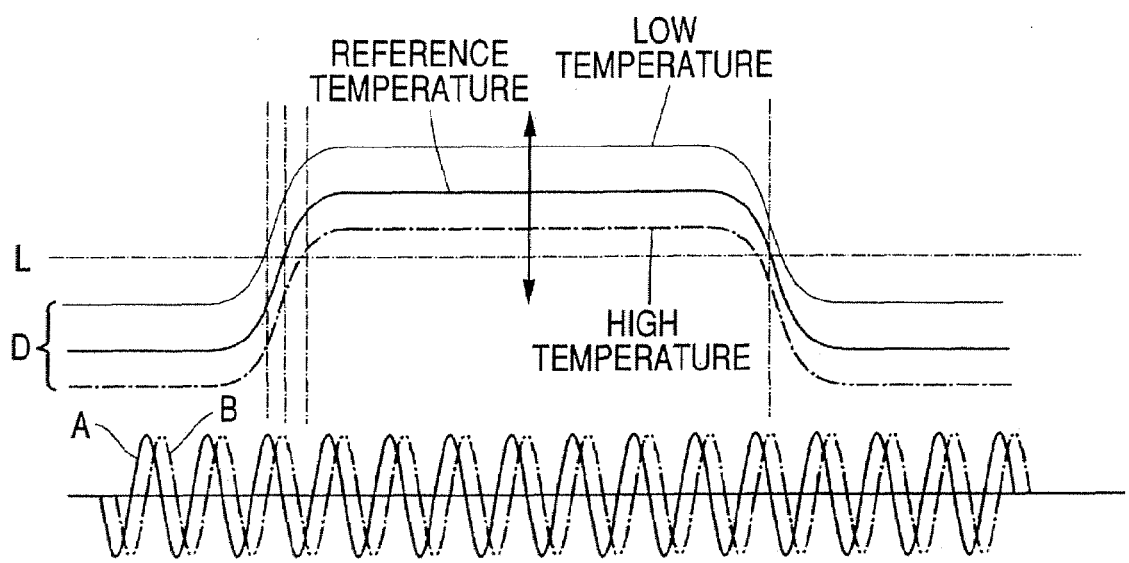
FIG. 37 shows waveforms of the outputs A, B of the differential amplifier and the output D of the current/voltage circuit in the case where no temperature compensation is effected.

FIG. 37 shows a signal D of the current detection circuit 26 in the case where no adaptation to temperature conditions is made. In this case, a change in temperature conditions causes a significant increase or decrease in the offset of the current flowing through the light source 11. In order to obtain the same light emission quantity, the current is required to be decreased in high temperature conditions and increased in low temperature conditions. The light receiving portion 15 has such temperature-dependent characteristics that the detection voltage tends to increase in high temperature conditions and decrease in low temperature conditions.

Some other members also have characteristics that change depending on the temperature. FIG. 37 shows the waveforms of the encoder signals A, B and the signal D of the current detection circuit 26 obtained based on the synthesized characteristic of the temperature characteristics of those members. According to this temperature characteristic, if the same light quantity is to be obtained, the value of the current tends to decrease at high temperatures and increase at low temperatures. In this case, in the process of comparing the signal D and a reference voltage L, the point at which the rising slope of the signal D intersects with the reference voltage L is greatly displaced depending on the temperature, which causes the problem that an error is included in absolute position detection.

Figure 38:
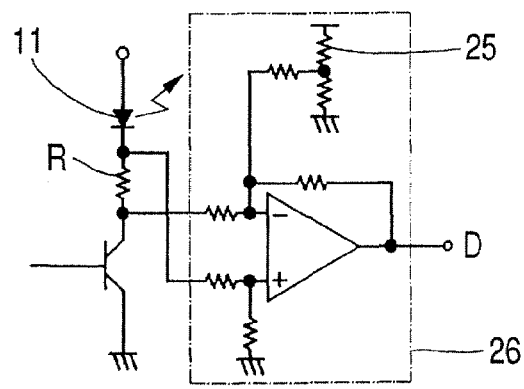
FIG. 38 is a circuit diagram according to embodiment 8.

FIG. 38 shows a circuit diagram of an arrangement for improving the temperature characteristics. Basic structure of the circuit is similar to that shown in FIG. 14. However, in embodiment 8, the resistor R connected in series with the light source 11 is a temperature-sensitive resistor having a positive temperature characteristic. Thus, when the current decreases at high temperatures, the value of the resistance R increases to cause an increase in the signal D output from the current detection circuit 26. Namely these effects cancel each other.

Figure 39:
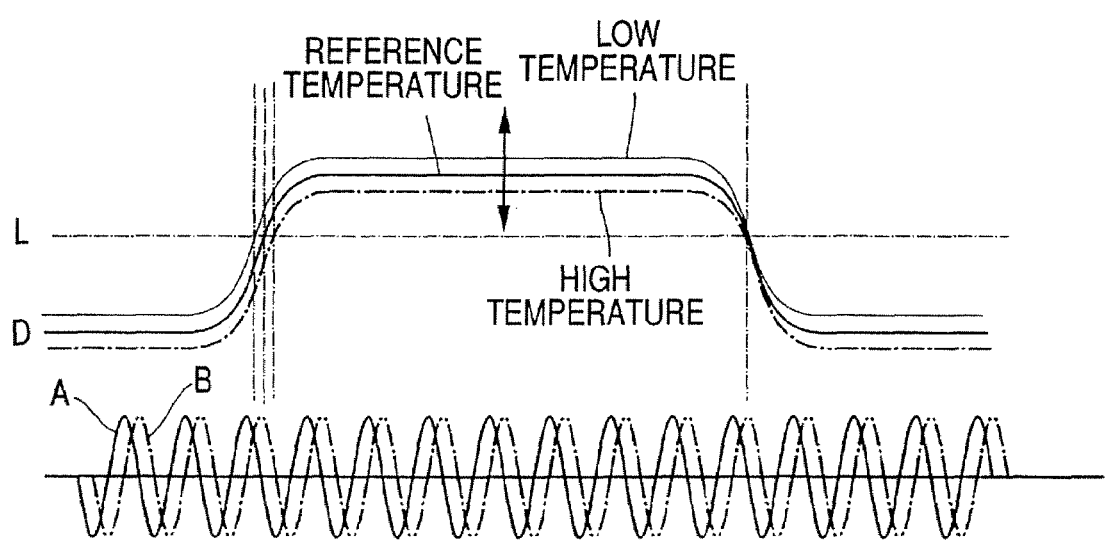
FIG. 39 shows waveforms of the outputs A, B of the differential amplifier and the output D of the current/voltage circuit in the case where temperature compensation is effected.
Figure 40:
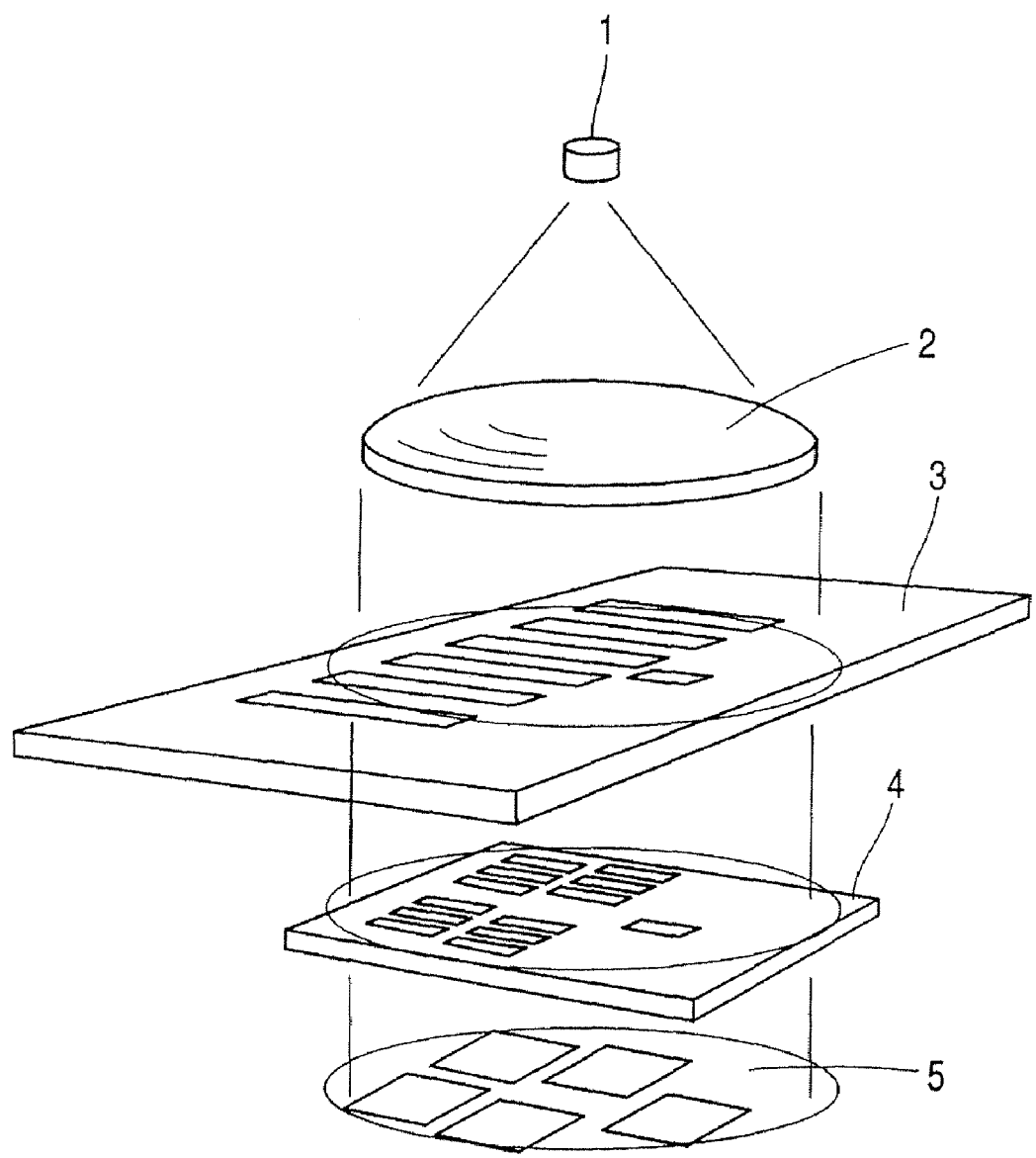
FIG. 40 is a perspective view showing a conventional optical encoder.
Figure 41:
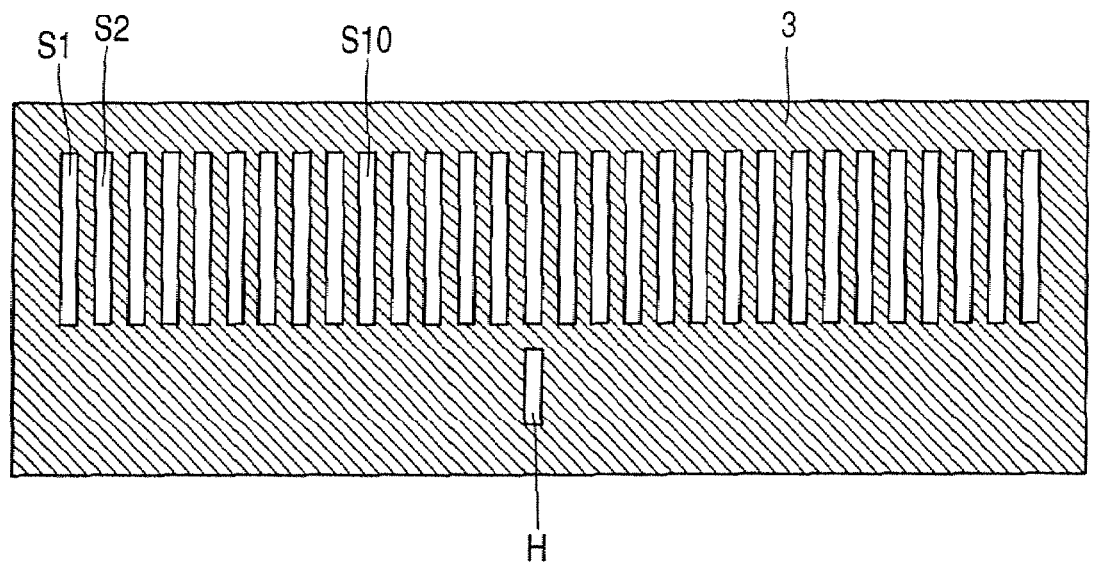
FIG. 41 is a plan view showing a conventional main scale.
Figure 42:
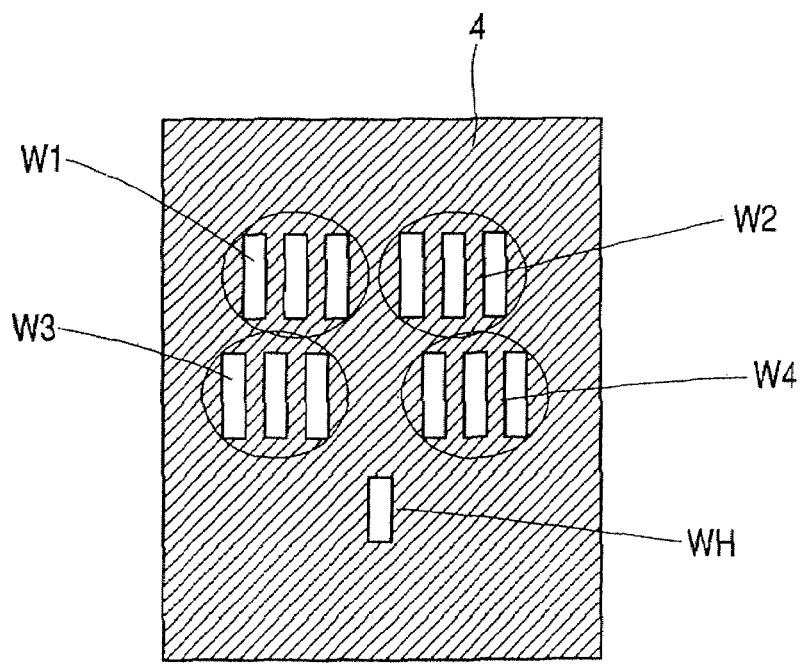
FIG. 42 is a plan view showing a conventional index scale.
Figure 43:
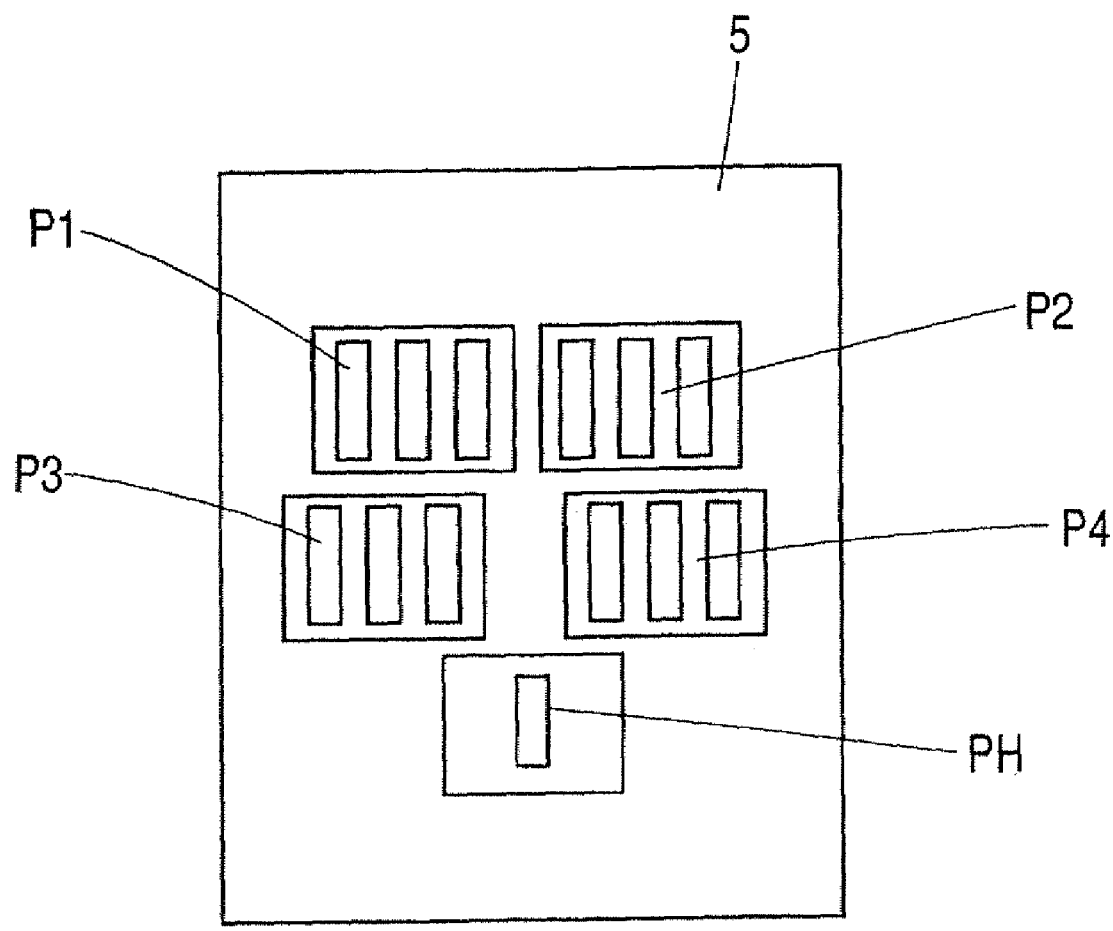
FIG. 43 is a plan view showing a conventional light receiving portion.
Figure 44:
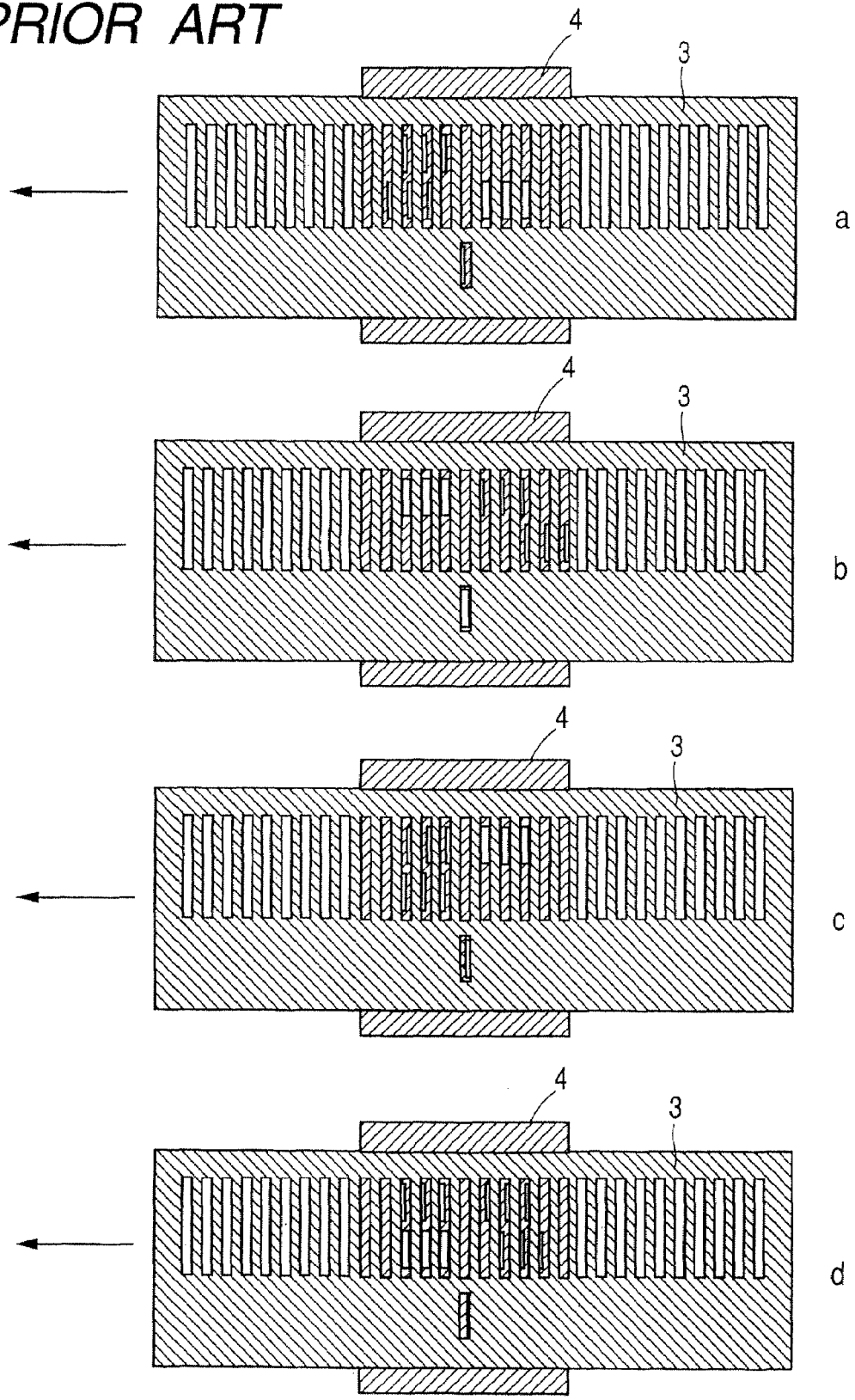
FIG. 44 illustrates an operation of the conventional optical encoder.
Figure 45:
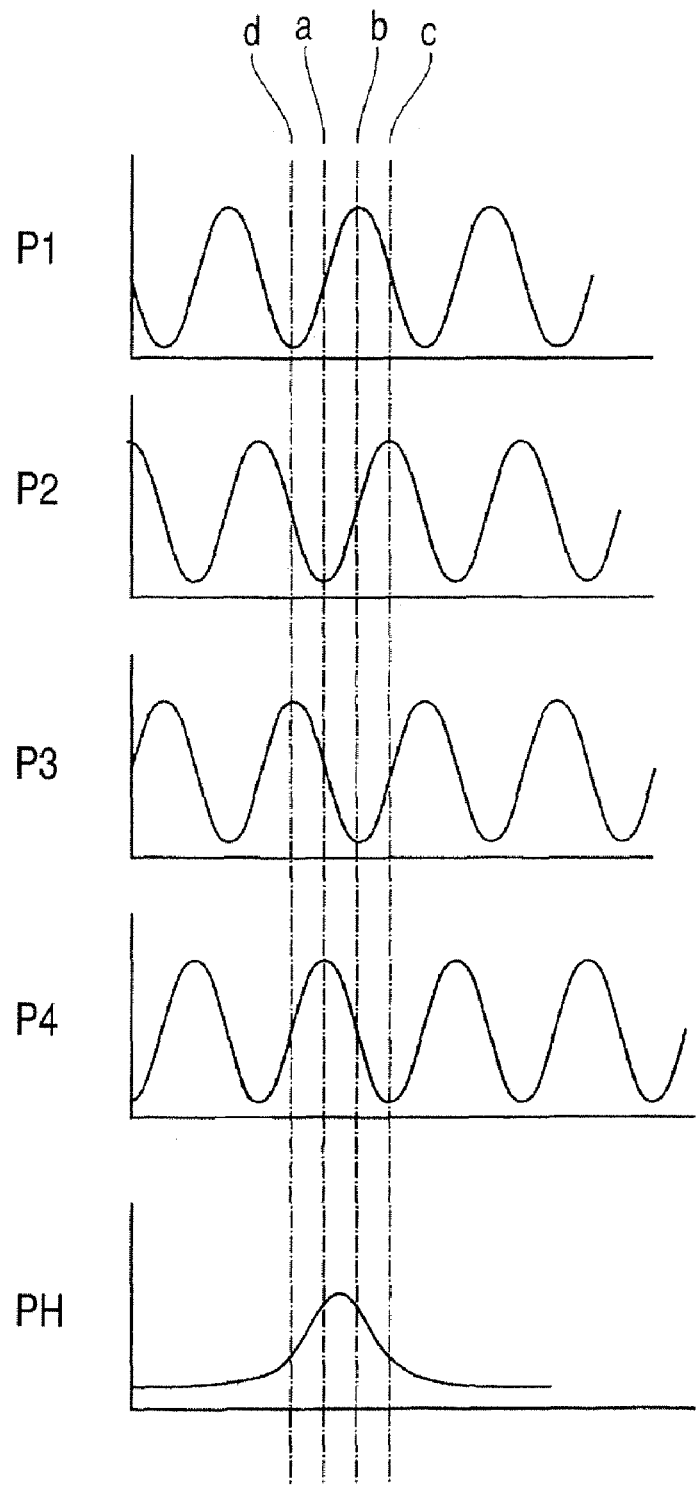
FIG. 45 shows waveforms of output signals of conventional photodiodes.

Therefore, by virtue of the temperature coefficient of the resistor R and the temperature characteristics of the change in the current of the light receiving portion 15 in combination, the signal D does not change significantly even when the temperature changes as shown in FIG. 39. Therefore, it is possible to determine original point as the position at which the signal D intersects the reference voltage L accurately.

Although a temperature-sensitive resistor R is used in embodiment 8, alternatively, a temperature compensation circuit may be provided in the offset elimination circuit 25.

This application claims priority from Japanese Patent Application Nos. 2004-075827 filed on Mar. 17, 2004 and 2004-108687 filed on Apr. 1, 2004, which are hereby incorporated by reference herein.

What is claimed is:

1. An optical displacement measuring apparatus comprising:
   a light emitting portion; and
   a main scale with a plurality of light transmitting portions or a plurality of light reflecting portions for transmitting or reflecting a light flux emitted from the light emitting portion to a light receiving device having a plurality of light receiving parts which are disposed in equal intervals relating to the intervals of the plurality of light transmitting portionsor the plurality of light reflecting portions, and the light receiving device converts the light flux into electrical signals, the main scale being movable relative to said light emitting portion,
   wherein the main scale has a first area and a second area each having a plurality of light transmitting portions or a plurality of light reflecting portions disposed in first intervals in the first area and in second intervals in the second area, the first intervals and second intervals being different from each other, and
   wherein the electric signals from light receiving parts selected in respective predetermined intervals are added to obtain two phased signals and the first intervals of the scale and the second intervals of the scale are determined so that the mutual replacement between the scale and the light emitting portion obtained by processing the two phased signals are equal in the first area and second area and so that the first area or the second area is determined based on the difference of light quantity obtained by processing the electrical signals.

2. An optical displacement measuring apparatus according to claim 1, wherein the light receiving device is adapted to receive light fluxes from some of the light transmitting portions, or the light reflecting portions.

3. An optical displacement measuring apparatus according to claim 1, the light transmitting portions comprise slits.

4. An optical displacement measuring apparatus according to claim 1, further comprising a signal processing portion which processes said electric signal obtained from the light receiving portion, and detects a relative moving amount between the main scale and the light receiving portion and an absolute position of said main scale.

* * * * *

UNITED STATES PATENT AND TRADEMARK OFFICE
CERTIFICATE OF CORRECTION

PATENT NO. : 7,326,919 B2  Page 1 of 1
APPLICATION NO. : 11/535298
DATED : February 5, 2008
INVENTOR(S) : Atsuta et al.

It is certified that error appears in the above-identified patent and that said Letters Patent is hereby corrected as shown below:

Column 10

In line 26, please change "portionsor" to --portions or--.

Signed and Sealed this

Second Day of September, 2008

JON W. DUDAS
*Director of the United States Patent and Trademark Office*